United States Patent
Jung et al.

(10) Patent No.: US 8,103,209 B2
(45) Date of Patent: *Jan. 24, 2012

(54) APPARATUS AND METHOD FOR TRANSMITTING/RECEIVING NOTIFICATION MESSAGE IN A BROADCASTING SYSTEM, AND SYSTEM THEREOF

(75) Inventors: Bo-Sun Jung, Seongnam-si (KR);
Jong-Hyo Lee, Pyeongtack-si (KR);
Kook-Heui Lee, Yongin-si (KR);
Sung-Oh Hwang, Yongin-si (KR);
Jai-Yong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,695

(22) Filed: Aug. 16, 2010

(65) Prior Publication Data
US 2010/0311320 A1    Dec. 9, 2010

Related U.S. Application Data

(62) Division of application No. 11/505,496, filed on Aug. 17, 2006, now Pat. No. 7,801,513.

(51) Int. Cl.
*H04H 20/71* (2008.01)
*H04M 3/42* (2006.01)

(52) U.S. Cl. .................................. 455/3.01; 455/414.2

(58) Field of Classification Search .................. 370/469, 370/237, 343, 453, 392, 329, 252, 310, 520, 370/401, 450, 452.2, 241, 408, 328, 235, 370/230.1, 331, 260, 389, 254, 340, 336, 370/242, 232, 312, 319, 320, 321; 455/450, 455/452.2, 509, 464, 67.11, 411, 453, 67.13, 455/414.2, 412.2, 404.1, 422.1, 431, 432.1, 455/435.1, 456.2, 456.4, 12.1, 3.01; 709/207, 709/224

See application file for complete search history.

(56) References Cited

U.S. PATENT DOCUMENTS

| | | | |
|---|---|---|---|
| 2005/0043020 A1 | 2/2005 | Lipsanen et al. | |
| 2005/0270994 A1* | 12/2005 | Caloud et al. | 370/312 |
| 2005/0282518 A1* | 12/2005 | D'Evelyn et al. | 455/404.1 |
| 2006/0031180 A1* | 2/2006 | Tamarkin et al. | 705/412 |
| 2007/0010248 A1* | 1/2007 | Dravida et al. | 455/435.1 |
| 2007/0086465 A1* | 4/2007 | Paila et al. | 370/394 |
| 2007/0100984 A1* | 5/2007 | Jansky et al. | 709/223 |

FOREIGN PATENT DOCUMENTS

| | | |
|---|---|---|
| EP | 1 357 754 | 10/2003 |
| EP | 1 551 191 | 7/2005 |
| JP | 2000-196543 | 7/2000 |
| JP | 2002-111617 | 4/2002 |
| JP | 2004-007600 | 1/2004 |
| JP | 2005-051602 | 2/2005 |
| KR | 10-2002-0058966 | 7/2002 |
| KR | 10-2003-0046617 | 6/2003 |
| KR | 10-2003-0056561 | 7/2003 |
| KR | 10-2005-0014599 | 2/2005 |

(Continued)

*Primary Examiner* — Melody Mehrpour
(74) *Attorney, Agent, or Firm* — Roylance, Abrams, Berdo and Goodman, L.L.P.

(57) ABSTRACT

A terminal apparatus is provided for receiving a broadcast service from a broadcasting system. A receiver receives a notification message from the broadcasting system. A message parser parses the notification message received by the receiver according to a certain format. A controller determines whether the received notification message is a notification message to be used by a user or a notification message to be used by the terminal based on content of the notification message parsed by the message parser, and performs an operation according to the determination result.

20 Claims, 8 Drawing Sheets

FOREIGN PATENT DOCUMENTS

| RU | 2 251 224 | 4/2005 |
| WO | WO 03/041311 | 5/2003 |
| WO | WO 2005/015804 | 2/2005 |
| WO | WO 2005/022913 | 3/2005 |

* cited by examiner

APPARATUS AND METHOD FOR TRANSMITTING/RECEIVING NOTIFICATION MESSAGE IN A BROADCASTING SYSTEM, AND SYSTEM THEREOF

CROSS-REFERENCE TO RELATED PATENT APPLICATIONS

This application is a division of U.S. patent application Ser. No. 11/505,496, filed Aug. 17, 2006 now U.S. Pat. No. 7,801, 513, which claims the benefit under 35 U.S.C. §119(a) of an application entitled "Apparatus and Method for Transmitting/Receiving Notification Message in a Broadcasting System, and System thereof" filed in the Korean Intellectual Property Office on Aug. 17, 2005 and assigned Serial No. 2005-75459, an application entitled "Apparatus and Method for Transmitting/Receiving Notification Message in a Broadcasting System, and System thereof" filed in the Korean Intellectual Property Office on Oct. 8, 2005 and assigned Serial No. 2005-94678, and an application entitled "Apparatus and Method for Transmitting/Receiving Notification Message in a Broadcasting System, and System thereof" filed in the Korean Intellectual Property Office on Jan. 14, 2006 and assigned Serial No. 2006-4195, the entire disclosures of which are hereby incorporated by reference.

BACKGROUND OF THE INVENTION

1. Field of the Invention

The present invention relates generally to an apparatus and method for transmitting/receiving messages in a broadcasting system. More particularly, the present invention relates to an apparatus and method for transmitting/receiving a notification message in a broadcasting system, and a system thereof.

2. Description of the Related Art

Generally, broadcast services are aimed to be provided to all users having terminals. Broadcast services are classified into an audio broadcast service like radio broadcasting that provides an audio only service, a video-oriented broadcast service like television (TV) providing audio and video services, and a multimedia broadcast service including audio, video and/or data services. These broadcast services have been primarily based on analog technologies, but are now evolving into digital broadcast services as a result of the rapid progress of the communication technologies. In addition, broadcast services are transitioning from the existing telecommunication tower-based broadcast service into a wire network-based multimedia broadcast service providing high-definition, high-rate data by wire, satellite-based multimedia broadcast service, and a multimedia broadcast service based on both wire networks and the satellites.

The development of mobile communication technologies and broadcast services contributes to providing portable broadcasting to users.

FIG. 1 is a conceptual diagram of a general system for providing a portable broadcast service.

A mobile terminal 104 can receive multimedia content provided by a content provider or service provider 105 and a service guide 101 for a provided service through a broadcast channel 102 or an interaction channel 103. The broadcast channel 102 includes Digital Video Broadcasting (DVB), $3^{rd}$ Generation Partnership Projects Multimedia Broadcast Multicast Service (3GPP MBMS), and $3^{rd}$ Generation Partnership Projects 2 Broadcast/Multicast Service (3GPP2 BCMCS), and can also include other broadcasting technologies such as Digital Multimedia Broadcast (DMB), Digital Audio Broadcast (DAB), etc. The interaction channel 103 can include networks capable of providing interactive services, including various mobile communication networks, such as Code Division Multiple Access (CDMA), General Packet Radio Service (GPRS) and $3^{rd}$ Generation (3G) networks, and Wireless Local Area Network (WLAN). The content provider or service provider 105 can unidirectionally broadcast or multicast a service guide, high-capacity multimedia content, and a notification service to a plurality of terminals through the broadcast channel 102, and can provide the services through the interaction channel 103 when interaction service is needed.

In the portable broadcast service system (hereafter referred to as a "portable broadcast system"), networks of the content provider or service provider 105 have a need to transmit a notification for transmission or modification of the service guide and multimedia content, to a user of the mobile terminal 104. In addition, network providers of the portable broadcast system also need to have a notification function of providing messages notifying public notices, emergency disasters, emergency situations, etc. to the user of the mobile terminal.

Accordingly, there is a need for a clear definition of message formats used for the notifications and an operation method based on the message formats. Also there is a need for allowing the mobile terminal to efficiently handle the notification messages and provide the messages to the user.

SUMMARY OF THE INVENTION

Exemplary embodiments of the present invention address at least the above problems and/or disadvantages and provide at least the advantages described below. Accordingly, an aspect of an exemplary embodiment of the present invention is to provide an apparatus and method for transmitting/receiving notification messages in a broadcasting system, and a system thereof.

It is another aspect of an exemplary embodiment of the present invention to provide an apparatus and method for generating notification messages in a broadcasting system, and a system thereof.

It is further another aspect of an exemplary embodiment of the present invention to provide an apparatus and method for receiving notification messages from a broadcasting system, and a system thereof.

According to one aspect of an exemplary embodiment of the present invention, there is provided an apparatus for transmitting a message in a broadcasting system. The apparatus comprises a Notification Event Function for receiving a notification indicating content change information provided from a Content Creation and generating a notification event message for generating a notification message; a Notification Generation Function for generating a notification message to be used by a user of a terminal scheduled to receive the notification message or a notification message to be used by the terminal using the notification event message received from the Notification Event Function; and a Notification Distribution/Adaptation Function for transmitting the notification message received from the Notification Generation Function to the terminal via a specific network.

According to another aspect of an exemplary embodiment of the present invention, there is provided an apparatus for transmitting a message in a broadcasting system. The apparatus comprises a Notification Event Function for receiving a notification indicating content change information provided from a Content Creation and generating a notification event message for generating a notification message; a Notification Generation Function for generating a notification message using the notification event message received from the Notification Event Function, the notification message including a NotificationType indicating whether the notification message is a notification message to be used by a user of a terminal scheduled to receive the notification message or a notification message to be used by the terminal, a NotificationVersion indicating version information of the generated notification message, a PresentationType indicating a presentation type of the notification message, a UsageType indicating usage of a SessionInformation in the notification message, an EventType indicating by what event the notification message is configured, and a FilteringValue indicating information for executing content previously stored in the terminal; and a Notification Distribution/Adaptation Function for receiving the notification message from the Notification Generation Function and transmitting the received notification message to the terminal via a specific network.

According to further another aspect of an exemplary embodiment of the present invention, there is provided a method for transmitting a message in a broadcasting system. The method comprises the steps of: receiving, by a Notification Event Function, a notification indicating content change information provided from a Content Creation, generating a notification event for generating a notification message, and transmitting the generated notification event message to a Notification Generation Function; receiving, by the Notification Generation Function, the notification event message, generating a notification message to be used by a user or a notification message to be used by a terminal, and transmitting the generated notification message to a Notification Distribution/Adaptation Function; and receiving, by the Notification Distribution/Adaptation Function, the notification message and transmitting the received notification message to the terminal via a specific network.

According to yet another aspect of an exemplary embodiment of the present invention, there is provided a method for transmitting a message in a broadcasting system. The method comprises the steps of: receiving, by a Notification Event Function, a notification indicating content change information provided from a Content Creation, generating a notification event message for generating a notification message, and transmitting the generated notification event message to a Notification Generation Function; generating, by the Notification Generation Function, a notification message using the notification event message received from the Notification Event Function, and transmitting the generated notification message to a Notification Distribution/Adaptation Function, the notification message including a NotificationType indicating whether the notification message is a notification message to be used by a user or a notification message to be used by a terminal, a PresentationType indicating a presentation type of the notification message, an EventType indicating by what event the notification message is configured, and a FilteringValue indicating information for executing content previously stored in the terminal; and receiving, by the Notification Distribution/Adaptation Function, the notification message from the Notification Generation Function and transmitting the received notification message to the terminal via a specific network.

According to still another aspect of an exemplary embodiment of the present invention, there is provided a terminal apparatus for receiving a broadcast service from a broadcasting system. The apparatus comprises a receiver for receiving a notification message from the broadcasting system; and a controller for determining whether the received notification message is a notification message to be used by a user or a notification message to be used by the terminal based on content of the notification message, and performing an operation according to the determination result.

According to still another aspect of an exemplary embodiment of the present invention, there is provided a terminal apparatus for receiving a broadcast service from a broadcasting system. The apparatus comprises a receiver for receiving a notification message from the broadcasting system; and a controller for determining whether the received notification message is a notification message to be used by a user or a notification message to be used by the terminal according to NotificationType information in the notification message, controlling a display operation of the notification message according to PresentationType information of the notification message, checking a UsageType of the notification message to access a session according to usage of a SessionInformation of the notification message, checking NotificationVersion information of the notification message to determine whether the received notification message is a newly received notification message, checking an EventType of the notification message to perform a corresponding operation according to an event type of the received notification message, and checking a FilteringValue of the notification message to provide the user with the content whose FilteringValue is equal to the FilteringValue among the previously stored content.

According to still another aspect of an exemplary embodiment of the present invention, there is provided a method comprising the steps of: receiving, by a terminal, a notification message from the broadcasting system; determining whether the notification message is a notification message to be used by a user or a notification message to be used by the terminal; and performing any one of an operation of checking a PresentationType of the notification message if the notification message is a notification message to be used by a user, and an operation of checking a SessionInformation of the notification message to access a corresponding session if the notification message is a notification message to be used by the terminal.

According to still another aspect of an exemplary embodiment of the present invention, there is provided a method comprising the steps of receiving, by a terminal, a notification message from a broadcasting system; checking a NotificationVersion of the notification message to determine whether the received notification message is a newly received notification message; if the received notification message is a newly received notification message, checking a NotificationType of the notification message to determine whether the received notification message is a notification message to be used by a user or a notification message to be used by the terminal; checking an EventType of the notification message in order to discover content included in the notification message; checking a PresentationType of the notification message if the received notification message is a notification message to be used by a user; performing a display operation of the notification message according to the PresentationType of the notification message; and checking a FilteringValue of the received notification message, and providing the user with the content whose FilteringValue is equal to the FilteringValue among the content previously stored in the terminal.

According to still another aspect of an exemplary embodiment of the present invention, there is provided a broadcasting system comprising a notification message transmitter for generating a notification message and transmitting the notification message to a terminal upon receiving a notification event message generated due to content change information provided from a Content Creator or change information of the broadcasting system, related to transmission of the content; and the terminal for receiving the transmitted notification message, determining whether the notification message is a notification message to be used by a user or a notification message to be used by the terminal, checking a Presentation-Type of the notification message if the notification message is a notification message to be used by a user, and checking a SessionInformation of the notification message to access a corresponding session if the analyzed notification message is a notification message to be used by the terminal.

According to still another aspect of an exemplary embodiment of the present invention, there is provided a method for providing a broadcast service. The method comprises the steps of: receiving a notification event message generated due to content change information provided from a Content Creation or change information of a broadcasting system, related to transmission of the content; generating a notification message to be used by a user of a terminal scheduled to use the notification message or a notification message to be used by the terminal using the generated notification event message; transmitting the generated notification message to the terminal via a specific network; receiving the transmitted notification message; determining whether the notification message is a notification message to be used by a user or a notification message to be used by the terminal; and performing any one of an operation of checking a PresentationType of the notification message if the notification message is a notification message to be used by a user, and an operation of checking a SessionInformation of the notification message to access a corresponding session if the notification message is a notification message to be used by the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Although names of the entities defined in Open Mobile Alliance (OMA) BCAST, a standard group for applications of mobile terminals, will herein be equally used for convenience, these are not to limit the scope of the present invention, and exemplary embodiments of the present invention can be applied to any system having the similar technical background based in Internet Protocol (IP).

Figure 1:
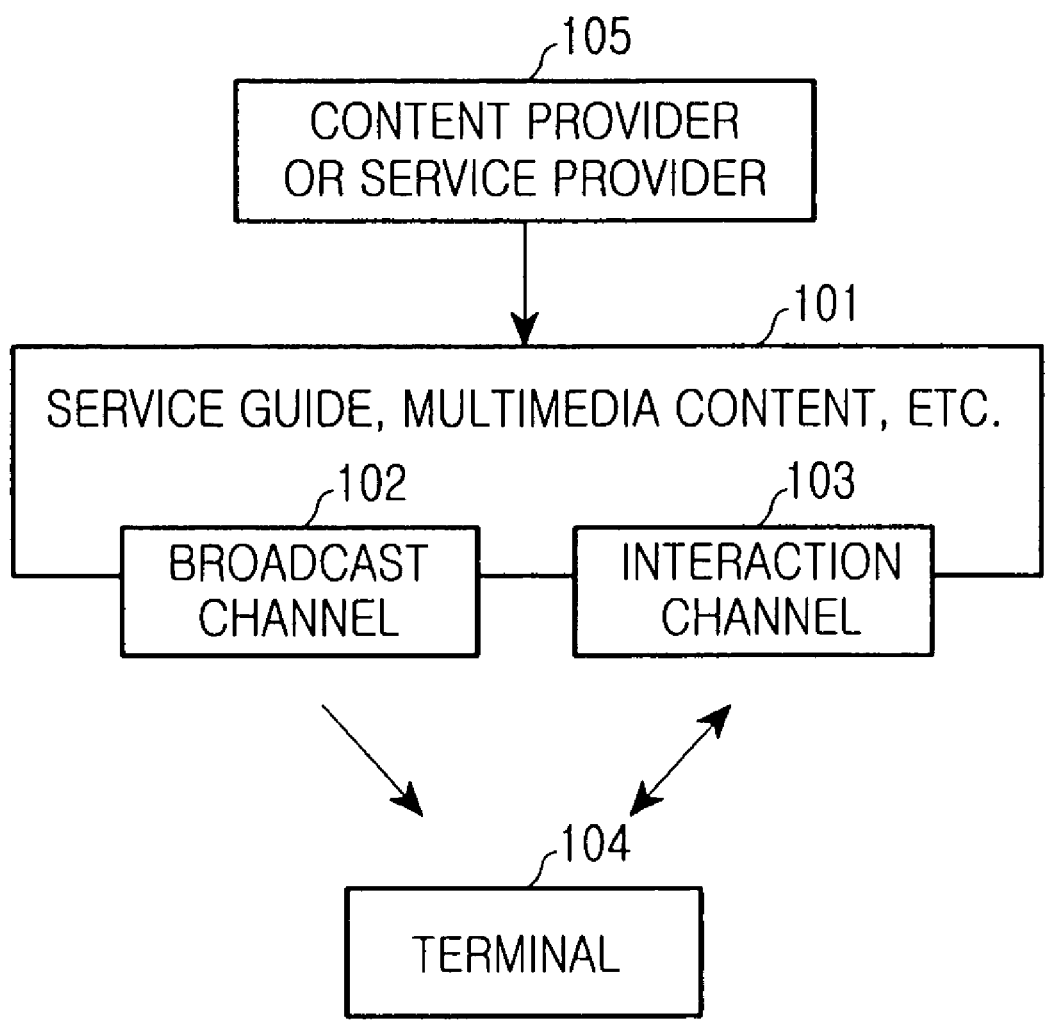
FIG. 1 is a conceptual diagram of a general system for providing a portable broadcast service.
Figure 2:
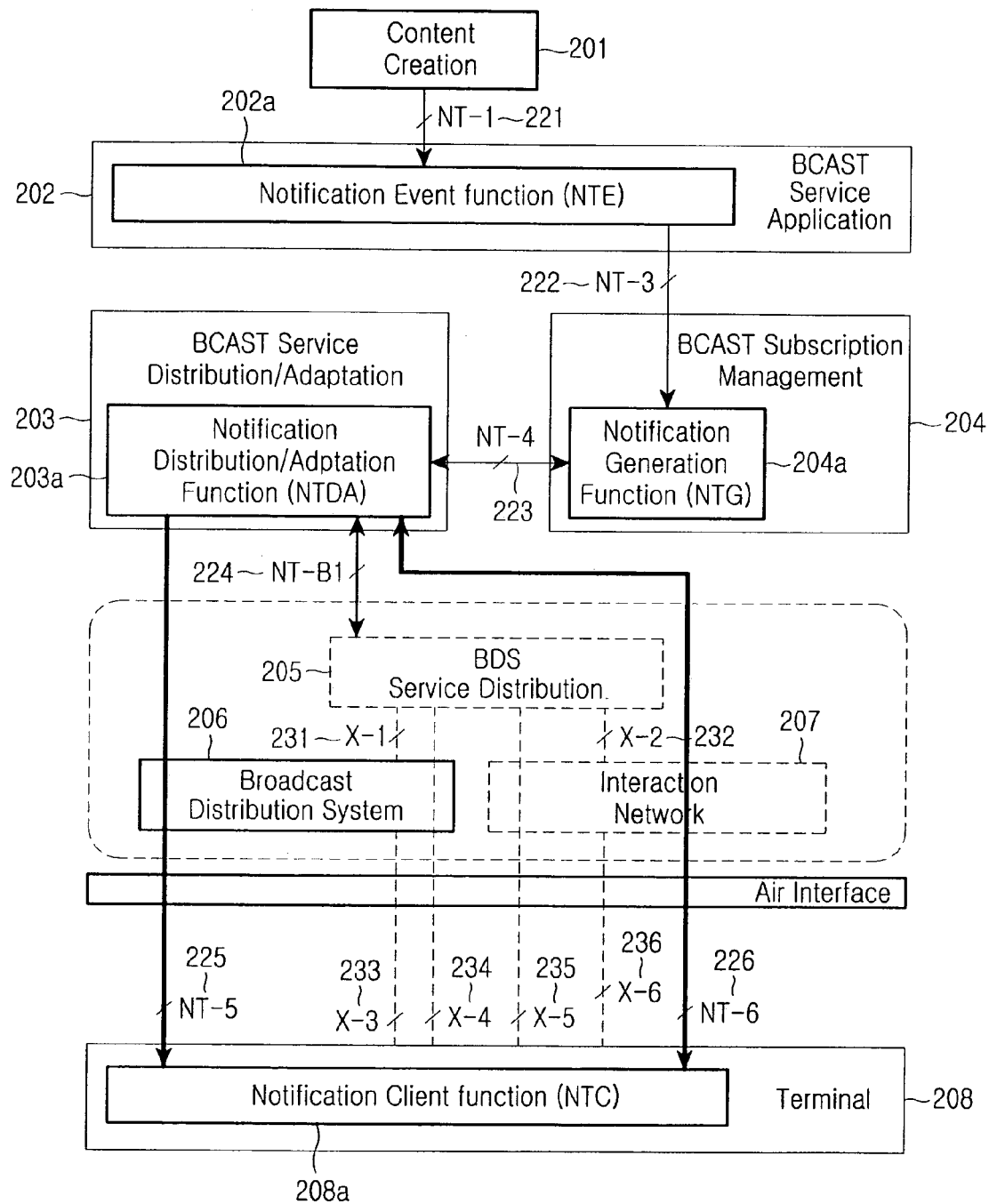
FIG. 2 is a block diagram illustrating the architecture for transmitting notification messages in a portable broadcast system according to an embodiment of the present invention.

FIG. 2 is a block diagram illustrating the architecture for transmitting notification messages in a portable broadcast system according to an embodiment of the present invention.

A Content Creation (or content provider) 201 is a provider of a broadcast service (hereinafter referred to as a BCAST service), and the BCAST service can include the conventional audio/video broadcast service, file (music file or data file) download service, etc. The Content Creation 201, if there is any problem in providing the BCAST service or any change in content information, notifies the change to a Notification Event Function (NTE) 202a in a BCAST Service Application 202. The Notification Event Function 202a transmits a notification event message to a Notification Generation Function (NTG) 204a based on the received event.

The BCAST Service Application 202 has a function of receiving data for the BCAST service provided from the Content Creation 201, handling the received data in the form appropriate for a BCAST network, and generating BCAST service data. BCAST Service Application 202 also has a function of generating standardized metadata necessary for a portable broadcast guide. In addition, the BCAST Service Application 202 receives a change in the content or the BCAST service, notified by the Content Creation 201, and notifies the change to the Notification Generation Function 204a located in a BCAST Subscription Management 204.

A BCAST Service Distribution/Adaptation 203 has a function of setting up a bearer to be used for transmitting the BCAST service data provided from the BCAST Service Application 202, a function of determining a transmission schedule for the BCAST service, and a function of generating a portable broadcast guide. The BCAST Service Distribution/Adaptation 203 is connected to a Broadcast Distribution System (BDS) 206 capable of providing a broadcast service, and an Interaction Network 207 supporting interaction communication. In addition, the BCAST Service Distribution/Adaptation 203, including therein a Notification Distribution/Adaptation Function (NTDA) 203a, receives a notification message from the BCAST Subscription Management 204 and transmits the notification message to one or a plurality of users via the BDS 206 or the Interaction Network 207. The BCAST Service Distribution/Adaptation 203 has session information needed by the Notification Generation Function 204a to generate notification messages for terminals, and the Notification Distribution/Adaptation Function 203a transmits the session information to the Notification Generation Function 204a.

The BCAST Subscription Management 204 manages service providing information, such as subscriber information for reception of the BCAST service and information on whether the subscriber has purchased the related content, and information on an apparatus for receiving the BCAST service, i.e. a Terminal 208 for receiving the BCAST service. In particular, the BCAST Subscription Management 204 includes the Notification Generation Function 204a. Therefore, when an event indicating an addition or change of a new function related to the BCAST service has occurred in the Content Creation 201 and the BDS 206, the Notification Generation Function 204a receives a notification event message including information on the occurred event, and generates a notification message accordingly thereto. In addition, when such event as a change in the BCAST service spontaneously occurs in the BCAST Subscription Management 204, the BCAST Subscription Management 204 internally delivers the corresponding event to the Notification Generation Function 204a to generate a notification message.

A BDS Service Distribution 205 has a function of distributing all received BCAST services through a broadcast channel or an interaction channel, and is an entity that can either exist or not exist according to the type of the BDS 206 implemented.

The BDS 206 is a network for transmitting BCAST services, and can be, for example, DVB-H, 3GPP MBMS, or 3GPP2 BCMCS. In addition, in the case where there is a change in broadcast information related to content transmission in transmitting a particular BCAST service, if an x-1 interface 231 or the BDS Service Distribution 205 exists, the BDS 206 notifies the change to the BCAST Service Distribution/Adaptation 203 via an NT-B1 interface 224.

The Interaction Network 207 transmits BCAST services on a one-to-one basis, or interactively exchanges control information and additional information related to reception of the BCAST services, and can be, for example, an existing cellular network.

The Terminal 208, a terminal capable of receiving the BCAST service, has a possible function of accessing the cellular network according to its capability. It is assumed herein that the Terminal 208 is a terminal capable of accessing the cellular network. The Terminal 208 receives a notification message transmitted via an NT-5 interface 225 using a Notification Client Function (NTC) 208a, and performs an appropriate operation according to the received notification message. Alternatively, the Terminal 208 receives a notification message transmitted via an NT-6 interface 226, and performs an appropriate operation according to the received notification message. A structure of the Terminal 208 will be described in detail hereinbelow with reference to FIG. 3.

Next, a description will be made of the interfaces between block elements of the portable broadcast system.

An NT-1 interface 221, an interface between the Notification Event Function 202a located in the BCAST Service Application 202 and the Content Creation 201, is used deliver a corresponding notification event to the Notification Event Function 202a when a notification-requiring event occurs in the Content Creation 201.

An NT-3 interface 222, an interface from the Notification Event Function 202a located in the BCAST Service Application 202 to the Notification Generation Function 204a of the BCAST Subscription Management 204, delivers information necessary for notification of an event or for generation of a notification message so that the Notification Generation Function 204a can generate the notification message.

An NT-4 interface 223 is an interface between the Notification Generation Function 204a located in the BCAST Subscription Management 204 and the Notification Distribution/Adaptation Function 203a of the BCAST Service Distribution/Adaptation 203. The NT-4 interface 223 is used for transmitting a notification message to the Notification Distribution/Adaptation Function 203a in order to transmit the notification message generated in the Notification Generation Function 204a to the BDS 206 or the Interaction Network 207, or used by the Notification Distribution/Adaptation Function 203a to transmit a notification message for an event occurred in the BDS 206.

The NT-5 interface 225, an interface used when the notification message provided from the Notification Distribution/Adaptation Function 203a of the BCAST Service Distribution/Adaptation 203 is directly transmitted to the Terminal 208 through a broadcast channel via the BDS 206, is used for transmitting a notification message to one or a plurality of terminals.

The NT-6 interface 226, an interface used when the notification message provided from the Notification Distribution/Adaptation Function 203a of the BCAST Service Distribution/Adaptation 203 is directly transmitted to the Terminal 208 through a dedicated channel to the Terminal 208 via the Interaction Network 207, or through a broadcast channel provided by the Interaction Network 207, is used for transmitting a notification message to one or a plurality of terminals 208.

The NT-B1 interface 224 is an interface between the BCAST Service Distribution/Adaptation 203 and the BDS Service Distribution 205, used as a transmission path to be used by the BCAST Service Distribution/Adaptation 203 at the BDS 206, or as a reception path for the event information generated in the BDS 206. The NT-B1 interface 224 serves to transmit the notification event message generated by the Interaction Network 207 to the BCAST Service Distribution/Adaptation 203. That is, the Notification Distribution/Adaptation Function 203a of the BCAST Service Distribution/Adaptation 203 transmits the event message received from the BDS 206 or the Interaction Network 207 through the NT-B1 interface 224 to the Notification Generation Function 204a through the NT-4 interface 223.

The x-1 interface 231 is an interface used for setting up a transmission path that the BDS 206 will use in the Interaction Network 207, by the BCAST Service Distribution/Adaptation 203 when the BDS Service Distribution 205 does not exist. However, when the BDS Service Distribution 205 exists, the x-1 interface 231 is used as an interface between the BDS 206 and the BDS Service Distribution 205, for notifying the event occurred in the BDS 206.

An X-2 interface 232 is an interface used for setting up a transmission path that the BCAST Service Distribution/Adaptation 203 will use in the Interaction Network 207 when the BDS Service Distribution 205 does not exist. However, when the BDS Service Distribution 205 exists, the X-2 interface 232 is used as an interface between the BDS 206 and the Interaction Network 207, for setting up a bearer where a notification message is to be used in the Interaction Network 207 and for transmitting a notification message.

An X-3 interface 233, an interface between the BDS 206 and the Terminal 208, is used for the BCAST service or all messages transmitted through the broadcast channel.

An X-4 interface 234 is a broadcast channel interface between the BDS Service Distribution 205 and the Terminal 208.

An X-5 interface 235 is an interaction channel interface between the BDS Service Distribution 205 and the Terminal 208.

An X-6 interface 236 is an interaction interface via which the Interaction Network 207 can transmit control information related to the BCAST service.

The Notification Event Function 202a has a function of delivering the information necessary for generating a notification message to the Notification Generation Function 204a, and upon detecting occurrence of a notification-requiring event, delivers information on the event to the Notification Generation Function 204a. The Notification Generation Function 204a generates a notification message using the information and event necessary for generating a notification message, received from the Notification Event Function 202a. When the Notification Generation Function 204a receives a notification event from the BDS 206 via the Notification Distribution/Adaptation Function 203a, it generates a notification message and transmits the notification message to the Notification Distribution/Adaptation Function 203a.

In the process of generating the notification message, if there is a need to indicate a start of the service, the Notification Event Function 202a receives a notification indicating a change in the service information from the Content Creation 201. Accordingly, defined is one case where there is a need for transmitting a new portable broadcast guide and another case where a particular event occurs in the BDS 206.

The Notification Distribution/Adaptation Function 203a serves to transmit a notification message via the NT-5 interface 225 or the NT-6 interface 226. When the Notification Distribution/Adaptation Function 203a receives from the BDS 206 a change in the information on a particular portable broadcast service it delivers a corresponding notification event to the Notification Generation Function 204a via the NT-4 interface 223. An example, of a change in the information on a particular portable broadcast service is information indicating adjustment of a data rate due to a wireless network environment or information indicating an impossibility of the service, In FIG. 2, the Notification Generation Function 204a and the Notification Distribution/Adaptation Function 203a will be referred to as a "notification message transmitter."

In the following description, an embodiment in which a terminal performs a corresponding operation according to a notification message received from a portable broadcast system is defined as a first embodiment, and an embodiment in which a terminal checks version information of a received notification message and performs a corresponding operation according to the version information is defined as a second embodiment.

Figures 3, 4:
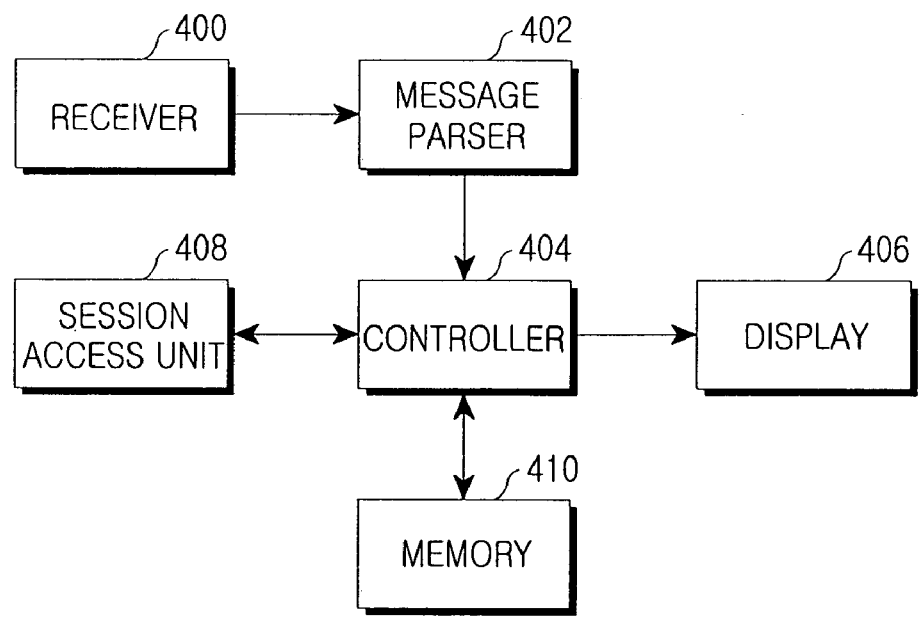
FIG. 3 is a diagram illustrating a notification message schema table according to first and second embodiments of the present invention.
FIG. 4 is a block diagram illustrating a structure of a terminal according to first and second embodiments of the present invention.

FIG. 3 is a diagram illustrating a notification message schema table according to first and second embodiments of the present invention.

Referring to FIG. 3, Name 301 indicates names of an element value and an attribute value constituting a corresponding message.

Type 302 indicates whether the corresponding name corresponds to an element value or an attribute value. The element value has values of E1, E2, E3 and E4 in tree form: E1 means an upper element value for the whole message, E2 indicates a sub-element value of E1, E3 indicates a sub-element value of E2, and E4 indicates a sub-element value of E3. The attribute value is indicated by A, and A indicates an attribute value of the corresponding element. For example, A under E1 indicates an attribute value of E1.

Category 303 is used for indicating whether a corresponding element value or attribute value is mandatory, and has a value M if the value is mandatory, and a value O if the value is optional.

Cardinality 304 indicates relations between the elements, and has values of 0, 0 . . . 1, 1, 0 . . . n, 1 . . . n, where "0" means an optional relation, "1" means a mandatory relation, and 'n' means the possibility of having a plurality of values. For example, 0 . . . n means the possibility that there is no corresponding element value or there are n corresponding element values.

Description 305 defines the meaning of the corresponding element or attribute value.

With reference to Table 1 to Table 5, a description will now be made of the whole schema for a notification message according to an embodiment of the present invention.

Table 1 to Table 5 illustrates the whole schema for a notification message. As illustrated, data types of all element values and attribute values for the schema according to an embodiment of the present invention can be variously defined according to usage.

Table 1 to Table 5 are divided from one table for convenience, and a definition of items in each table follows that of Table 1.

TABLE 1

| Number | Name | Type | Category | Cardinality | Description |
|---|---|---|---|---|---|
| 501 | Notification | E1 | O | 0 . . . N | Notification message Fragment Contains the following attributes and elements. Attributes: |
| | | | | | id NotificationType Validity Elements: |
| | | | | | Name Description PresentationType ExtensionURL SessionInformation MediaInformation |
| 502 | id | A | M | 1 | Notification message identifier |
| 503 | NotificationType | A | M | 1 | Notification type: if 0, UserUse if 1, TerminalUse ServiceProvider Defined possible |
| 504 | Validity | A | O | 0 . . . 1 | Valid time of Fragment |
| 505 | Name | E2 | M | 1 . . . N | Title of Notification Fragment Contains the following attribute. Lang |

TABLE 1-continued

| Number | Name | Type | Category | Cardinality | Description |
|---|---|---|---|---|---|
| 506 | Lang | A | O | 0...1 | Language |
| 507 | Description | E2 | M | 1...N | Content or description of Notification Message |
| 508 | Lang | A | O | 0...1 | Language |

Notification 501 indicates a corresponding notification message fragment, and includes attribute values of id 502, NotificationType 503 and Validity 504, and sub-element values of Name 505 and Description 507 both in Table 1, PresentationType 509 in Table 2, ExtensionURL 510 and SessionInformation 511, both in Table 3, and MediaInformation 523 in Table 4. The attribute values of id 502, NotificationType 503 and Validity 504, and the element values of Name 505, Description 507, PresentationType 509 and ExtensionURL 510 in the notification message are commonly used for every notification message. The Notification 501 may not include the SessionInformation 511 and the MediaInformation 523 according to usage of the notification message.

The id 502, a unique identifier of the notification message fragment, is a mandatory element. The corresponding identifiers help distinguish between stored notification messages.

NotificationType 503 indicates whether type or usage of the notification message indicates use for user (hereinafter referred to as "user use"), use for terminal (hereinafter referred to as "terminal use"), or another use, and is a mandatory element. If the corresponding value is '0', it indicates the user use, and if the corresponding value is '1', it indicates the terminal use. In addition, NotificationType 503 can define various values according to a purpose of the service provider.

Validity 504 indicates a valid time for the notification message, and is optional. Therefore, if the time defined in Validity 504 lapses, the notification message stored in the terminal is deleted.

Name 505 indicates a title or name of the notification message, and is a mandatory element. It can be defined in various languages.

Lang 506, an attribute value for Name 505, indicates a language of the content written in Name 505 and is an optional value. If Lang 506 has no value, it is set to a value defined as Default, and the Default value can indicate a language in the corresponding service area or English.

Description 507 is the actual message content included in the notification message or a description part of the message. It can be defined in various languages and is a mandatory value.

Lang 508, an attribute value for Description 507, indicates a language of the content written in Description 507 and is an optional value. If Lang 508 has no value, it is set to a value defined as Default, and the Default value can indicate a language in the corresponding service area or English.

TABLE 2

| 509 | PresentationType | E2 | M | 1 | Definition of PresentationType for Message<br>PresentationType = 0: Terminal immediately displays notification message on screen upon receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |

In Table 2, PresentationType 509 defines a presentation type of the notification, and is a mandatory value. The presentation type indicates whether a terminal will output a corresponding message to its display after giving priority to the notification message and stopping all services, will store the message content in a designated device, i.e. memory, or will overlay the notification message on the currently-received service or content before outputting it to the display. PresentationType 509 can be defined in various types according to a purpose of the service provider.

For example, if PresentationType is set to "0," a terminal receiving the notification message provides the notification message to the user upon receipt of the message. If PresentationType is set to "1," the terminal stores the received notification message in a memory, and later provides the notification message to the user at the user's request. In addition, if PresentationType is set to "2," the terminal overlays the notification message on the service currently provided through the display, for the user.

TABLE 3

| 510 | ExtensionURL | E2 | O | 0...N | URL for additional information |
| 511 | SessionInformation | E2 | O | 0...N | Session information for data |

TABLE 3-continued

|     |                  |    |   |       | Attributes:<br>ValidFrom<br>ValidTo<br>UsageType<br>Elements:<br>DeliverySession<br>TransportObjectID<br>Fragment<br>AlternativeURI |
|-----|------------------|----|---|-------|--------------------------------------------------------------------------|
| 512 | ValidFrom        | A  | O | 0...1 | Start time of session                                                    |
| 513 | ValidTo          | A  | O | 0...1 | End time of session                                                      |
| 514 | UsageType        | A  | O | 0...1 | Usage type of Session (for example, Service Guide, File Delivery, etc.)  |
| 515 | DeliverySession  | E3 | M | 1     | Session information for delivery content attributes:<br>SourceIP<br>TransportSessionID |
| 516 | SourceIP         | A  | M | 1     | SourceIP address to be transmitted                                       |
| 517 | TransportSessionID | A | M | 1     | Session ID to be transmitted                                             |
| 518 | TransportObjectID | E3 | O | 0...N | ID for transmission Object                                               |

In Table 3, ExtensionURL 510 indicates a URL of a service or content server for additional information for a notification message, and is an optional value.

SessionInformation 511 indicates session information for data reception, and is an optional value. SessionInformation 511 is information on the session where there is a corresponding service guide or there are file and the content when the service guide is updated or the file and content are received. SessionInformation 511 has attribute values of ValidFrom 512, ValidTo 513 and UsageType 514, and element values of DeliverySession 515 and TransportObjectID 518, both in Table 3, and Fragment 519 and AlternativeURI 522 both in Table 4, as its sub-element values.

ValidFrom 512 indicates a start time of the time where SessionInformation 511 is valid, and is an optional value.

ValidTo 513 indicates an end time of the time where SessionInformation 511 is valid, and is an optional value.

UsageType 514 indicates a usage type of SessionInformation 511, i.e. usage of the session information included in the notification message. UsageType 514 indicates whether the usage is for service guide update or for file reception, and can be defined in various types according to a purpose of the service provider.

DeliverySession 515 indicates a position value for the session where such object as the service guide or the file will be actually transmitted, and has attribute values of SourceIP 516 and TransportSessionID 517.

SourceIP 516, an IP address of the corresponding transmission session, is available for both broadcast and multicast.

TransportSessionID 517 has an ID value for the transmission session.

TransportObjectID 518 is a unique identifier for an object transmitted through the session.

TABLE 4

|     |                  |    |   |       |                                                                           |
|-----|------------------|----|---|-------|---------------------------------------------------------------------------|
| 519 | Fragment         | E3 | O | 0...N | Fragment information of transmission Object<br>Attributes:<br>FragmentID<br>FragmentVersion |
| 520 | FragmentID       | A  | O | 0...1 | ID value of Fragment                                                      |
| 521 | FragmentVersion  | A  | O | 0...1 | Version information of Fragment                                           |
| 522 | AlternativeURI   | E3 | O | 0...1 | Alternative URI Address capable of receiving transmitted Object           |
| 523 | MediaInformation | E2 | O | 0...1 | Media information for generation of Multimedia Notification Message<br>Elements:<br>Picture<br>Video<br>Audio |
| 524 | Picture          | E3 | O | 0...N | Picture information<br>Attributes:<br>MIMEtype<br>PictureURI              |
| 525 | MIMEtype         | A  | O | 0...1 | MIME type                                                                 |
| 526 | PictureURI       | A  | O | 0...1 | URI indicating position of picture                                        |
| 527 | Video            | E3 | O | 0...N | Picture information<br>Attributes:<br>MIMEtype<br>VideoURI                |

In Table 4, Fragment 519, which is fragment information of a transmission object, indicates updated particular fragment information for a service guide, and allows a terminal to check corresponding ID and version information, receive only the updated fragment and store the received fragment. Fragment 519 and its sub-attributes are needed only when the notification message is used to notify the service guide update, and are not used when the notification message is used for another purpose.

FragmentID 520 is a unique identification value of a fragment to be received.

FragmentVersion 521 indicates version information of the fragment to be received, and for the fragment having the same FragmentID, the corresponding version information is checked to determine whether the terminal has a FragmentID corresponding to the latest version. If there is the latest version in the session, the terminal receives the latest version value from the session and stores the received version value.

AlternativeURI 522 represents a URI value with a corresponding object and is provided in case the transmission through the session has failed or there is a need for reception not through a broadcast channel but through an interaction channel. The terminal can access a position of the corresponding URI through an interaction channel and receive a desired transmitted object.

MediaInformation 523 indicates media information for the generation of the notification message, and is needed for the notification message configured with multimedia. MediaInformation 523 is composed of sub-element values of Picture, Video and Audio.

Picture 524 indicates picture or image information, MIMEtype 525 indicates a Multipurpose Internet Mail Extension (MIME) type for a corresponding moving image, PictureURI 526 is a URI indicating a position of the picture or image, and Video 527 indicates information on the moving image. The "position of an image" refers to a position of a particular server when the corresponding image exists in the particular server rather than being included in the transmission notification message.

TABLE 5

| 528 | MIMEtype | A | O | 0...1 | MIME type |
| 529 | VideoURI | A | O | 0...1 | URI indicating position of Video |
| 530 | Audio | E3 | O | 0...N | Picture Information Attributes: MIMEtype AudioURI |
| 531 | MIMEtype | A | O | 0...1 | MIME type |
| 532 | AudioURI | A | O | 0...1 | URI indicating position of Audio |

In Table 5, MIMEtype 528 indicates a MIME type for the corresponding moving image, and VideoURI 529 is a URI indicating a position of the moving image. The "position of the moving image" refers to a position of a particular server when the corresponding moving image exists in the particular server rather than being included in the transmission notification message.

Audio 530 indicates information on audio, music, and a bell sound. MIMEtype 531 indicates a MIME type for the corresponding audio. AudioURI 532 is a URI indicating a position of the audio. The "position of the audio" refers to a position of a particular server when the corresponding audio exists in the particular server rather than being included in the transmission notification message.

Table 6 and Table 7 show a format of a message configured with texts, which is a notification message schema used for user use according to a first embodiment of the present invention. A definition of each item in Table 6 and Table 7 is equal to that of Table 1, and a detailed description of the same parts as those of Table 1 to Table 5 will be omitted. For convenience, Table 6 and Table 7 are divided from one table.

TABLE 6

| Number | Name | Type | Category | Cardinality | Description |
| --- | --- | --- | --- | --- | --- |
| 601 | Notification | E1 | O | 0...N | Notification Messge Fragment Contains the following attributes and elements. Attributes: id NotificationType Validity Elements: Name Description PresentationType ExtensionURL |
| 602 | id | A | M | 1 | Notification message identifier |
| 603 | NotificationType | A | M | 1 | Notification type: if 0, UserUse if 1, TerminalUse ServiceProvider Defined possible |
| 604 | Validity | A | O | 0...1 | Valid time of Fragment |
| 605 | Name | E2 | M | 1...N | Title of Notification Fragment Contains the following attribute. Lang |
| 606 | Lang | A | O | 0...1 | Language |
| 607 | Description | E2 | M | 1...N | Content or description of Notification Message |
| 608 | Lang | A | O | 0...1 | Language |

TABLE 7

| 609 | PresentationType | E2 | M | 1 | Definition of Presentation type for Message<br>PresentationType = 0: Terminal immediately displays notification message on screen upon receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |
|---|---|---|---|---|---|
| 610 | ExtensionURL | E2 | O | 0...N | URL for additional information |

The notification message for user use, shown in Table 6 and Table 7, proposed in an exemplary embodiment of the present invention, can be utilized for reception of public notices, advertisement messages, billing information, and payment information of the service provider or content provider. ExtensionURL 610, serving as CallbackURL, can receive additional information through an interaction channel.

The corresponding notification message includes attribute values of id 602, NotificationType 603 and Validity 604, and element values of Name 605, Description 607, PresentationType 609 and ExtensionURL 610. A description of all the sub-attribute values and sub-element values constituting the notification message shown in Table 6 and Table 7 is equal to the description of Table 1 to Table 5.

With reference to Table 8 to Table 10, a description will now be made of a format of a message configured with multimedia, which is a notification message schema used for user use according to the first embodiment of the present invention. For convenience, Table 8 to Table 10 are divided from one table. A definition of each item in Table 8 to Table 10 is equal to that of Table 1, and a detailed description of the same parts as those of Table 1 to Table 5 will be omitted.

TABLE 8

| Number | Name | Type | Category | Cardinality | Description |
|---|---|---|---|---|---|
| 701 | Notification | E1 | O | 0...N | Notification Message Fragment<br>Contains the following attributes and elements.<br>Attributes:<br><br>id<br>NotificationType<br>Validity<br>Elements:<br><br>Name<br>Description<br>PresentationType<br>ExtensionURL<br>MediaInformation |
| 702 | id | A | M | 1 | Notification message identifier |
| 703 | NotificationType | A | M | 1 | Notification Type:<br>if 0, UserUse<br>if 1, TerminalUse<br>ServiceProvider Defined possible |
| 704 | Validity | A | O | 0...1 | Valid time of Fragment |
| 705 | Name | E2 | M | 1...N | Title of Notification Fragment<br>Contains the following attribute.<br>Lang |
| 706 | Lang | A | O | 0...1 | Language |
| 707 | Description | E2 | M | 1...N | Content or description of Notification Message |
| 708 | Lang | A | O | 0...1 | Language |

TABLE 9

| 709 | PresentationType | E2 | M | 1 | Definition of Presentation Type for Message<br>PresentationType = 0: Terminal immediately displays notification message on screen upon receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |
|---|---|---|---|---|---|

TABLE 9-continued

| 710 | ExtensionURL | E2 | O | 0...N | URL for additional information |
|---|---|---|---|---|---|
| 723 | MediaInformation | E2 | O | 0...1 | Media information for generation of Multimedia Notification Message Elements: Picture Video Audio |
| 724 | Picture | E3 | O | 0...N | Picture information Attributes: MIMEtype PictureURI |
| 725 | MIMEtype | A | O | 0...1 | MIME type |
| 726 | PictureURI | A | O | 0...1 | URI indicating position of Picture |

TABLE 10

| 727 | Video | E3 | O | 0...N | Picture information Attributes: MIMEtype VideoURI |
|---|---|---|---|---|---|
| 728 | MIMEtype | A | O | 0...1 | MIME type |
| 729 | VideoURI | A | O | 0...1 | URI indicating position of Video |
| 730 | Audio | E3 | O | 0...N | Picture information Attributes: MIMEtype AudioURI |
| 731 | MIMEtype | A | O | 0...1 | MIME type |
| 732 | AudioURI | A | O | 0...1 | URI indicating position of Audio |

Table 8 to Table 10 shows a format of a message configured with multimedia, which is a notification message schema used for user use according to the first embodiment of the present invention. The notification message for user use, shown in Table 8 to Table 10, proposed in an exemplary embodiment of the present invention, helps configure a message using various multimedia files such as image, moving image, audio, etc., and can be variously utilized as an advertisement message for the service and content, and a message for public good, such as a missing child search. The notification message of Table 8 to Table 10 includes the attribute values of id 702, NotificationType 703 and Validity 704, and the element values of Name 705, Description 707, PresentationType 709, ExtensionURL 710 and MediaInformation 723. A description of all the sub-attribute values and sub-element values constituting the notification message shown in Table 8 to Table 10 are equal to the description from Table 1 to Table 5.

With reference to Table 11 to Table 13, a description will now be made of a format of a message including session information, which is a notification message schema used for terminal use according to the first embodiment of the present invention. For convenience, Table 11 to Table 13 are divided from one table, and a definition of items in each table follows that of Table 1 to Table 5.

TABLE 11

| Number | Name | Type | Category | Cardinality | Description |
|---|---|---|---|---|---|
| 801 | Notification | E1 | O | 0...N | Notification Message Fragment Contains the following attributes and elements. Attributes: id NotificationType Validity Elements: Name Description PresentationType ExtensionURL SessionInformation |
| 802 | id | A | M | 1 | Notification message identifier |
| 803 | NotificationType | A | M | 1 | Notification Type: if 0, UserUse if 1, TerminalUse ServiceProvider Defined possible |
| 804 | Validity | A | O | 0...1 | Valid time of Fragment |
| 805 | Name | E2 | M | 1...N | Title of Notification Fragment Contains the following attribute. Lang |
| 806 | Lang | A | O | 0...1 | Language |
| 807 | Description | E2 | M | 1...N | Content or description of Notification Message |
| 808 | Lang | A | O | 0...1 | Language |

TABLE 12

| 809 | PresentationType | E2 | M | 1 | Definition of Presentation Type for Message PresentationType = 0: Terminal immediately displays notification message on screen upon |
|---|---|---|---|---|---|

TABLE 12-continued

| | | | | | |
|---|---|---|---|---|---|
| | | | | | receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |
| 810 | ExtensionURL | E2 | O | 0 . . . N | URL for additional information |
| 811 | SessionInformation | E2 | O | 0 . . . N | Session information for data<br>Attributes:<br><br>ValidFrom<br>ValidTo<br>UsageType<br>Elements:<br><br>DeliverySession<br>TransportObjectID<br>Fragment<br>AlternativeURI |
| 812 | ValidFrom | A | O | 0 . . . 1 | Start time of session |
| 813 | ValidTo | A | O | 0 . . . 1 | End time of session |
| 814 | UsageType | A | O | 0 . . . 1 | Usage type of Session (for example, Service Guide, File Delivery, etc.) |

TABLE 13

| | | | | | |
|---|---|---|---|---|---|
| 815 | DeliverySession | E3 | M | 1 | Session information for delivery content<br>Attributes:<br>SourceIP<br>TransportSessionID |
| 816 | SourceIP | A | M | 1 | SourceIP address to be transmitted |
| 817 | TransportSessionID | A | M | 1 | Session ID to be transmitted |
| 818 | TransportObjectID | E3 | O | 0 . . . N | ID for transmission Object |
| 819 | Fragment | E3 | O | 0 . . . N | Fragment information of transmission Object<br>Attributes:<br>FragmentID<br>FragmentVersion |
| 820 | FragmentID | A | O | 0 . . . 1 | ID value of Fragment |
| 821 | FragmentVersion | A | O | 0 . . . 1 | Version information of Fragment |
| 822 | AlternativeURI | A | O | 0 . . . 1 | |

Table 11 to Table 13 show a format of a message including session information, which is a notification message schema used for terminal use according to the first embodiment of the present invention. The typical usage of the notification message used for terminal use, written in Table 11 to Table 13, is to provide update information of the service guide to the terminal so as to help the terminal to store the updated service guide. In addition, the notification message schema of Table 11 to Table 13 can be variously used for a start of the service or content, file download start, and delivery of a multimedia notification message transmitted through a separate session.

Although it is stated that the typical usage of the notification message is to provide service guide update information to the terminal, other usages except for the above-stated usages can replace the typical usage As to the separate session, the portable broadcast system generally opens a session with a multicast address to transmit content, and transmits the corresponding content to the terminal. In this case, when the terminal is already receiving a content service from the portable broadcast system with a particular session, another separate session other than a previously established session is called the separate session.

The notification message for terminal use, shown in Table 11 to Table 13, proposed in the first embodiment of the present invention, includes the attribute values of id 802, NotificationType 803 and Validity 804, and the element values of Name 805, Description 807, PresentationType 809, ExtensionURL 810 and SessionInformation 811. A description of all the sub-attribute values and sub-element values constituting the notification message shown in Table 11 to Table 13 is equal to the description of Table 1 to Table 5.

FIG. 4 is a block diagram illustrating a structure of a terminal according to first and second embodiments of the present invention. In the portable broadcast system to which the exemplary embodiments of the present invention is applied, the Terminal 208 has the conceptual structure shown in FIG. 2, but it may also have an actual logical structure shown in FIG. 4.

A receiver 400 receives the notification message from the portable broadcast system, and delivers the received notification message to a message parser 402.

The message parser 402 parses the notification message received from the portable broadcast system via the receiver 400 according to the message format. If the terminal receives a notification message from the portable broadcast system in a binary format, the message parser 402 should include a specific function block for analyzing the notification message received in the binary format.

If the notification message is configured in an Extensible Markup Language (XML) format, the message parser 402 includes an XML parser to parse the received notification message. The message parser 402 parses the notification message received through the receiver 400, checks the content of NotificationType, which is one of attribute values, and delivers the content to a controller 404. For example, if a value of NotificationType is '0' indicating that the received notification message is for user use, the message parser 402 delivers the content to the controller 404 and allows the controller 404 to perform a corresponding operation.

The controller 404 controls the terminal depending on NotificationType of the notification message parsed by the message parser 402 according to the first and second embodiments of the present invention. For example, in the first embodiment, if the NotificationType is '0' indicating that the received notification message for user use, the controller 404 provides the received notification message to the user through a display 406. In this case, the notification message can be a Short Message Service (SMS) message or a multimedia message.

On the contrary, if NotificationType is '1' indicating that the received notification message is for terminal use, the controller 404 recognizes that the corresponding message is a message for service guide and update notice. In order to check the content of the changed or updated session information, the controller 404 allows a session access unit 408 to access a corresponding session, receive designated content such as service guide, file and object in the accessed session, and store the received content in a memory 410. Herein, "accessing the corresponding session" means accessing the portable broadcast system with session information specified in a notification message if the session information is included in the received notification message.

According to the second embodiment of the present invention, if a newly received notification message is equal in version to the previously received notification message, the controller 404 discards the newly received notification message. If the notification messages are unequal to each other in version, the controller 404 performs a corresponding operation according to the content of the newly received notification message. Specifically, the controller 404 determines whether the received notification message is a new one or not depending on the id 502 of Table 1 and NotificationVersion information added according to the second embodiment of the present invention. These processes will be described in detail hereinbelow with reference to Table 14 to Table 26.

Of these processes, a process according to the first embodiment will be described in detail hereinbelow with reference to FIG. 5, and a process according to the second embodiment will be described in detail hereinbelow with reference to FIG. 7.

If PresentationType of the notification message parsed by the message parser 402 is '1', the controller 404 stores the received notification message in the memory 410 so that the user can use it later.

If NotificationType of the notification message parsed by the message parser 402 according to an embodiment of the present invention is '1' indicating that the received notification message is for terminal use, the session access unit 408 accesses the corresponding session under the control of the controller 404. Further, the session access unit 408 receives the designated content such as the service guide, file and object in the accessed session.

The memory 410 stores the service guide, file and object received through the session access unit 408, and also stores the notification message with PresentationType="1".

The display 406 generally displays text, picture, moving image and/or still image under the control of the controller 404. According to an embodiment of the present invention, if PresentationType is "0", the display 406, under the control of the controller 404, stops the content in service like the image, and outputs the received notification message.

However, if PresentationType of the notification message is "2", the display 406, under the control of the controller 404, outputs the received notification message on the content currently in service in an overlay fashion.

Figure 5:
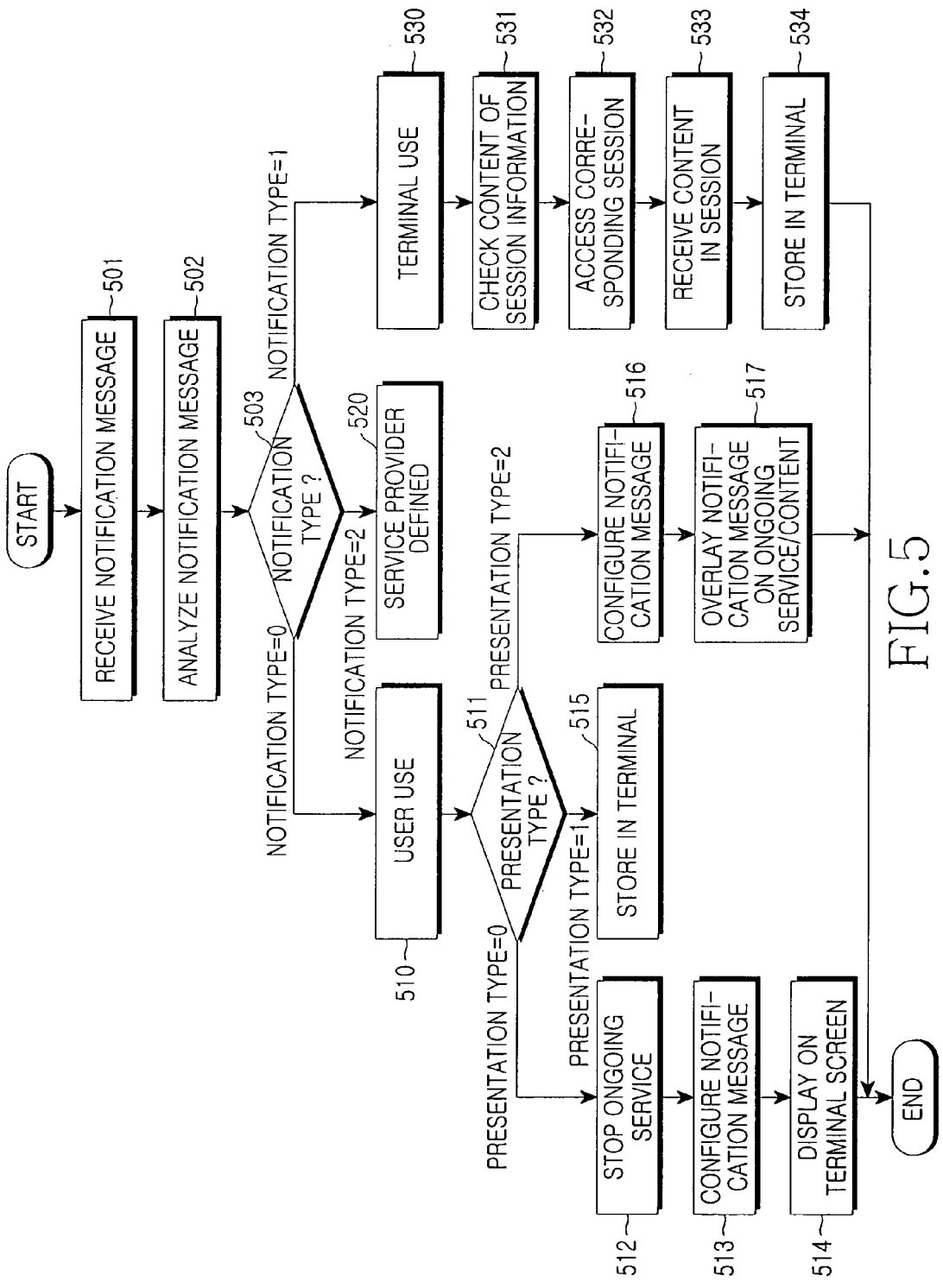
FIG. 5 is a flowchart illustrating a process of receiving a notification message in a terminal according to the first embodiment of the present invention.

FIG. 5 is a flowchart illustrating a process of receiving a notification message in a terminal according to a first embodiment of the present invention. The attribute values and element values for the notification message have been described above.

In step 501, a terminal receives a notification message from a portable broadcast system using a receiver 400. In step 502, a message parser 402 parses a corresponding message according to a format in which the received notification message is configured. If the notification message is configured in the XML format, the message parser 402 parses the received message using an XML parser included therein.

In step 503, a controller 404 checks NotificationType of the notification message parsed by the message parser 402, and performs a predefined operation according to the check result, and a description thereof will be made hereinbelow. If NotificationType is "0" indicating that the received notification message is for user use, the controller 404 proceeds to step 510. If NotificationType is "1" indicating that the received notification message is for terminal use, the controller 404 proceeds to step 530. If NotificationType is "2" or greater, indicating that the received notification message is a message defined by a service provider, the controller 404 proceeds to step 520 where it performs a specific operation defined by the service provider. Herein, when NotificationType is "2", the service provider can freely define the notification message according to their business model and service.

In step 510, the controller 404 can provide the received notification message to the user through a display 406 because the received notification message is a message received for user use. The notification message received for user use can be an SMS message or a multimedia message. With the use of this message, the service provider can provide various types of messages such as service event notification, system failure/checkup notice, text or multimedia advertisement for the service/content, disaster broadcast message, billing notice, etc. As for this notification message, the controller 404 checks PresentationType, and if the received notification message has high priority which is set according to the check result, the controller 404 outputs the received notification message through the display 406. The PresentationType can be freely defined according to the business model and service of the service provider, and will have a different value from the value defined above.

In step 511, the controller 404 should determine whether to handle the received notification message depending on the PresentationType of the received notification message. If the PresentationType of the received notification message is '0', the controller 404 determines that the received notification message is a message that should be urgently provided to the user. If the PresentationType is '1', the controller 404 stores the received notification message in a memory 410 so that the user can use it later. Finally, if the PresentationType is '2', the controller 404 overlays the corresponding notification message on the content in service.

If it is determined in step 511 that the PresentationType of the received notification message is '0' indicating that the corresponding message should be urgently sent to the user, the controller 404 proceeds to step 512 where it stops the ongoing service. In step 513, the controller 404 configures the received notification message such that it can be directly provided to the user. In step 514, the controller 404 displays the configured notification message through the display 406 according to a predefined screen configuration method. Herein, "configuring the received notification message" means, if the notification message is configured in the XML format, reconfiguring the message according to the predefined screen configuration method so as to provide such information as text, image, audio and video included in the message to the user.

If it is determined in step 511 that the PresentationType of the received notification message is '1', the controller 404 stores the notification message in the memory 410 in step 515. Later, the user can check the notification message stored in the memory 410 through a proper operation.

Finally, if it is determined in step 511 that the PresentationType of the received notification message is '2', the controller 404 reconfigures, in step 516, the notification message according to a screen configuration method defined by a Terminal 208 in order to overlay the received notification message on the ongoing service/content through the display 406.

In step 517, the controller 404 overlays the notification message generated in step 516 on the currently-received content, and provides the overlay results to the user through the display 406.

However, if it is determined in step 503 that the PresentationType of the received notification message is '1', the controller 404 determines in step 530 that the received notification message is for terminal use.

The controller 404 checks session information content of the received notification message in step 531, and accesses the corresponding session based on the session information content in step 532. The controller 404 receives the designated content such as service guide, file and object in the accessed session in step 533, and stores or updates the received content in the memory 410 in step 534.

Figure 6:
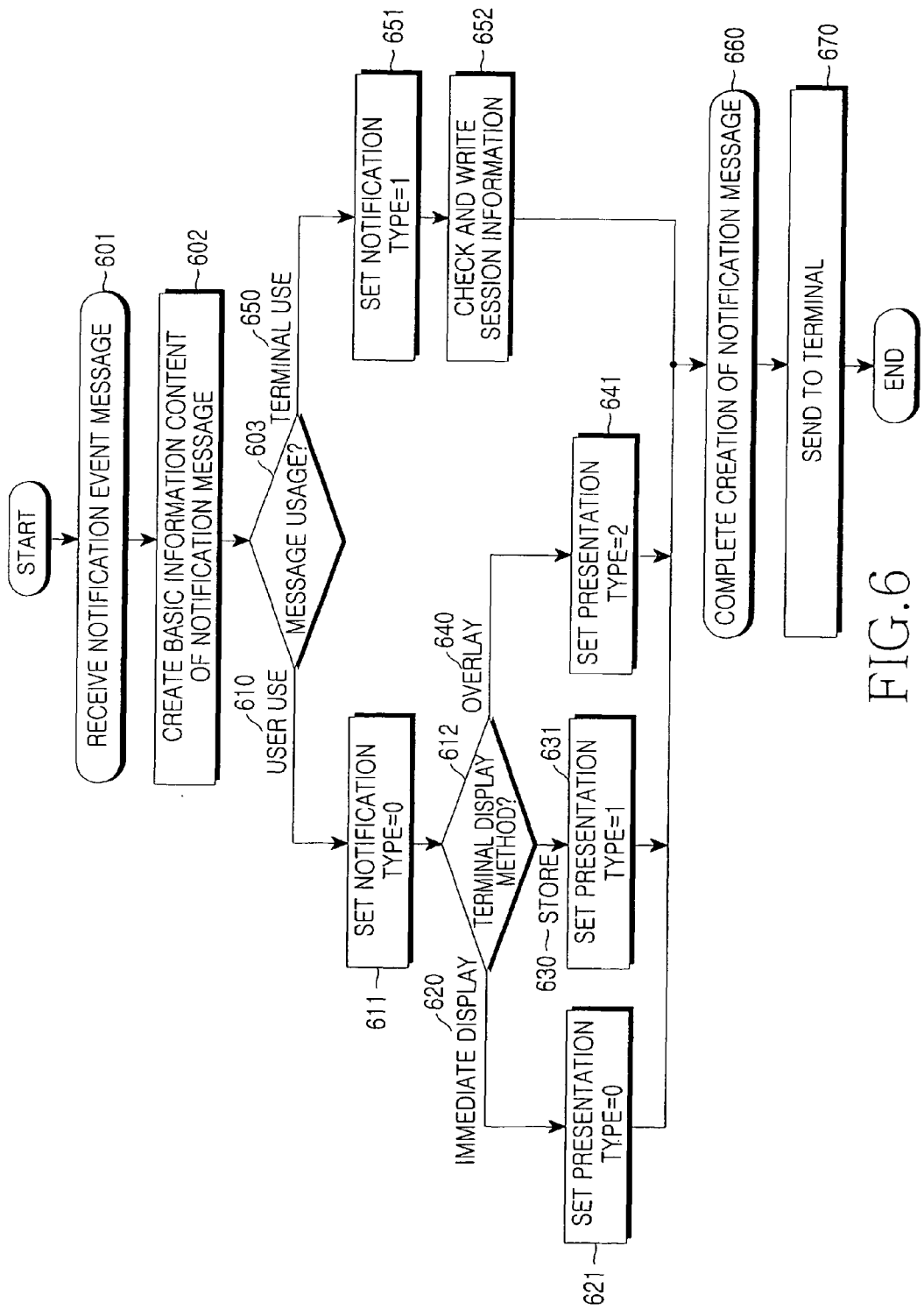
FIG. 6 is a flowchart illustrating a process of generating a notification message in a portable broadcast system according to the first embodiment of the present invention.

FIG. 6 is a flowchart illustrating a process of generating a notification message in a portable broadcast system according to a first embodiment of the present invention.

The element values and attribute values for the notification message described in FIG. 6 have been described with reference to Table 1 to Table 10.

The notification message is generated by the Notification Generation Function 204a described in FIG. 2 at the request of the content provider, service provider or network provider, or based on a notification event generated by the portable broadcast service system.

In step 601, the Notification Generation Function 204a receives from a Notification Event Function 202a a notification event message notifying change/failure of the system and service, change/delivery of a service guide, delivery of content, advertisement, emergency situation, emergency disaster, etc.

In step 602, based on the received notification event message, the Notification Generation Function 204a creates basic information for a notification message, i.e. attribute values of id and Validity, and element values of Name, Description, ExtensionURL, and MediaInformation.

In step 603, after creating the basic information, the Notification Generation Function 204a determines whether the notification message to be transmitted to a terminal is for user use or for terminal use, and sets NotificationType according to the determination result.

If the notification message is for user use (610), the Notification Generation Function 204a sets NotificationType to "0" in step 611.

After setting NotificationType to "0" in step 611, the Notification Generation Function 204a determines in step 612 whether it will immediately display the corresponding message on the user terminal, store the corresponding message in the terminal to output it later at the user's request, or overlay the corresponding message on the content in service for the user.

If the Notification Generation Function 204a determines to immediately display the notification message upon receipt of it (620) in the process of determining a method for displaying the notification message on the terminal in step 612, it sets PresentationType of the notification message to "0" in step 621. However, if the Notification Generation Function 204a determines to store the notification message in the terminal to output it later at the user's request (630), it sets PresentationType to "1" in step 631.

Finally, if the Notification Generation Function 204a determines to overlay the notification message on the currently-provided content for the user (640), it sets PresentationType in the notification message to "2" in step 641.

However, if it is determined in step 603 that the notification message is for terminal use (650), the Notification Generation Function 204a sets NotificationType of the notification message to "1" in step 651.

In step 652, the notification message for terminal use, as described in the notification message format section, is used as a message notifying update/delivery of a service guide or delivery of service/content, and needs session information for the corresponding message. Therefore, in order to generate the terminal-use notification message, the Notification Generation Function 204a needs corresponding session information. The session information is stored in a BCAST Service Distribution/Adaptation 203, and as a Notification Distribution/Adaptation Function 203a of the BCAST Service Distribution/Adaptation 203 delivers the session information to the Notification Generation Function 204a, the Notification Generation Function 204a checks the session information and then sets the related information. The session information is written in elements 511 to 522 of Table 3 and Table 4 in the first embodiment.

After completion of setting for the notification message for user use or terminal use, the Notification Generation Function 204a configures the notification message in step 660. In step 670, the Notification Generation Function 204a transmits the generated notification message to the terminal via the Notification Distribution/Adaptation Function 203a.

A description will now be made of a notification message format, and a notification message transmission/reception apparatus and method in a portable broadcast system according to a second embodiment of the present invention.

The whole schema for a notification message according to the second embodiment of the present invention will now be described with reference to Table 14 to Table 18.

Table 14 to Table 18 illustrate the whole schema for a notification message according to the second embodiment of the present invention, and it further includes NotificationVersion indicating a version of the notification message, compared with that of the first embodiment of the present invention. The NotificationVersion is a basic attribute value used regardless of usage of the notification message, like the value commonly used in the first embodiment.

Table 14 to Table 18 are divided from one table for convenience, and a definition of items in each table follows that of Table 14.

TABLE 14

| Number | Name | Type | Category | Cardinality | Description |
|---|---|---|---|---|---|
| 1100 | Notification | E1 | O | 0 ... N | Notification Message Fragment Contains the following attributes and elements. Attributes: id NotificationVersion NotificationType Validity Elements: Name Description PresentationType ExtensionURL SessionInformation MediaInformation |
| 1101 | id | A | M | 1 | Notification message identifier |
| 1102 | NotificationVersion | A | M | 1 | Version information of Notification message |
| 1103 | NotificationType | A | M | 1 | Notification Type: if 0, UserUse if 1, TerminalUse ServiceProvider Defined possible |
| 1104 | Validity | A | O | 0 ... 1 | Valid time of Fragment |
| 1105 | Name | E2 | M | 1 ... N | Title of Notification Fragment Contains the following attribute. Lang |
| 1106 | Lang | A | O | 0 ... 1 | Language |
| 1107 | Description | E2 | M | 1 ... N | Content or description of Notification Message |
| 1108 | Lang | A | O | 0 ... 1 | Language |

Notification 1100 indicates a corresponding notification message fragment, and includes attribute values of id 1101, NotificationVersion 1102, NotificationType 1103 and Validity 1104, and sub-element values of Name 1105 and Description 1107 both in Table 14, PresentationType 1109 in Table 15, ExtensionURL 1110 and SessionInformation 1111 both in Table 16, and MediaInformation 1123 in Table 17.

The id 1101, a unique identifier of the notification message fragment, is a mandatory element. The corresponding identifiers help distinguish between stored notification messages.

NotificationVersion 1102 indicates a version number of the notification message. In the second embodiment of the present invention, the reason for defining a version number of a notification message in the notification message is that the portable broadcast system may repeatedly transmit the notification message if necessary. This is effective when the notification message is lost during transmission or there is a need to notify an updated version for a certain notified service. When the portable broadcast system repeatedly transmits the notification message, the terminal needs a criterion for determining whether the received notification message is a new message. Therefore, the second embodiment of the present invention adds an attribute of NotificationVersion 1102 in Table 14 as a fragment attribute of the Notification 1100. According to the second embodiment of the present invention, the terminal receiving the notification message can check version information of the corresponding notification message when it uses the NotificationVersion 1102 and id 1101 together. That is, when the terminal receives the notification message repeatedly transmitted by the portable broadcast system, it can determine whether the received notification message is a new notification message.

In order to use NotificationVersion 1102 according to the second embodiment of the present invention, it is possible to allocate, to the NotificationVersion 1102, an integer type version number or Timestamp using Network Time Protocol (NTP), which is an Internet standard used to synchronize computers connected to a network. Other methods can also be used for the NotificationVersion 1102. For a repeatedly transmitted message indicated by the NotificationVersion 1102, the Timestamp or integer type version number of the NotificationVersion 1102 maintains the NotificationVersion information defined when the notification message is initially generated.

NotificationType 1103 indicates whether type or usage of the notification message indicates user use, terminal use, or another use, and is a mandatory element. If a value of NotificationType 1103 is '0', it indicates the user use, and if the value of NotificationType 1103 is '1', it indicates the terminal use. In addition, NotificationType 1103 can define various values according to a purpose of the service provider.

Validity 1104 indicates a valid time for the notification message, and is optional. Therefore, if the time defined in Validity 1104 lapses, the notification message stored in the terminal is deleted.

Name 1105 indicates a title or name of the notification message, and is a mandatory element. It can be defined in various languages.

Lang 1106, an attribute value for Name 1105, indicates a language of the content written in Name 1105 and is an optional value. If Lang 1106 has no value, it is set to a value defined as Default, and the Default value can indicate a language in the corresponding service area or English.

Description 1107 is the actual message content included in the notification message or a description part of the message. It can be defined in various languages and is a mandatory value.

Lang 1108, an attribute value for Description 1107, indicates a language of the content written in Description 1107 and is an optional value. If Lang 1108 has no value, it is set to a value defined as Default, and the Default value can indicate a language in the corresponding service area or English.

TABLE 15

| 1109 | PresentationType | E2 | M | 1 | Definition of Presentation Type for Message<br>PresentationType = 0: Terminal immediately displays notification message on screen upon receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |
|---|---|---|---|---|---|

In Table 15, PresentationType 1109 defines a presentation type of the notification, and is a mandatory value. The presentation type indicates whether a terminal will output a corresponding message to its display after giving priority to the notification message and stopping all services, store the message content in a designated device, i.e. memory, or overlay the notification message on the currently-received service or content before outputting it to the display. PresentationType 1109 can be defined in various types according to a purpose of the service provider.

For example, if PresentationType is set to "0," a controller 404 of a terminal receiving the notification message provides the notification message to the user through a display 406 upon receipt of the message. If PresentationType is set to "1," the controller 404 stores the received notification message in a memory 410. In addition, if PresentationType is set to "2," the controller 404 overlays the notification message on the service currently provided through the display 406, for the user.

element values of DeliverySession 1115 and TransportObjectID 1118, both in Table 16, and Fragment 1119 and AlternativeURI 1122 both in Table 17, as its sub-element values. That is, the SessionInformation 1111 is used to provide session information for the service that a Terminal 208 will receive. The usage of the SessionInformation 1111 can be determined depending on UsageType 1114. The terminal can determine what content is to be included in the SessionInformation 1111 depending on the UsageType 1114 of the received notification message.

ValidFrom 1112 indicates a start time of the time where SessionInformation 1111 is valid, and is an optional value.

ValidTo 1113 indicates an end time of the time where SessionInformation 1111 is valid, and is an optional value.

UsageType 1114 indicates a usage type of SessionInformation 1111. That is, UsageType 1114 indicates whether the usage is for service guide update or for file reception, and can be defined in various types according to a purpose of the service provider.

TABLE 16

| 1110 | ExtensionURL | E2 | O | 0 . . . N | URL for additional information |
|---|---|---|---|---|---|
| 1111 | SessionInformation | E2 | O | 0 . . . N | Session information for data<br>Attributes:<br>ValidFrom<br>ValidTo<br>UsageType<br>Elements:<br>DeliverySession<br>TransportObjectID<br>Fragment<br>AlternativeURI |
| 1112 | ValidFrom | A | O | 0 . . . 1 | Start time of session |
| 1113 | ValidTo | A | O | 0 . . . 1 | End time of session |
| 1114 | UsageType | A | O | 0 . . . 1 | Usage type of Session (for example, Service Guide, File Delivery, etc.) |
| 1115 | DeliverySession | E3 | M | 1 | Session information for delivery content<br>Attributes:<br>SourceIP<br>TransportSessionID |
| 1116 | SourceIP | A | M | 1 | SourceIP address to be transmitted |
| 1117 | TransportSessionID | A | M | 1 | Session ID to be transmitted |
| 1118 | TransportObjectID | E3 | O | 0 . . . N | ID for transmission Object |

In Table 16, ExtensionURL 1110 indicates a URL of a service or content server for additional information for a notification message, and is an optional value.

SessionInformation 1111 indicates session information for data reception, and is an optional value. SessionInformation 1111 is information on the session where there is a corresponding service guide or there are file and the content when the service guide is updated or the file and content are received. SessionInformation 1111 has attribute values of ValidFrom 1112, ValidTo 1113 and UsageType 1114, and DeliverySession 1115 indicates a position value for the session where such object as the service guide or the file will be actually transmitted, and has attribute values of SourceIP 1116 and TransportSessionID 1117.

SourceIP 1116, an IP address of the corresponding transmission session, is available for both broadcast and multicast.

TransportSessionID 1117 has an ID value for the transmission session.

TransportObjectID 1118 is a unique identifier for an object transmitted through the session.

TABLE 17

| | | | | | |
|---|---|---|---|---|---|
| 1119 | Fragment | E3 | O | 0...N | Fragment information of transmission Object Attribute: FragmentID FragmentVersion |
| 1120 | FragmentID | A | O | 0...1 | ID value of Fragment |
| 1121 | FragmentVersion | A | O | 0...1 | Version information of Fragment |
| 1122 | AlternativeURI | E3 | O | 0...1 | Alternative URI Address capable of receiving transmitted Object |
| 1123 | MediaInformation | E2 | O | 0...1 | Media information for generation of Multimedia Notification Message Attributes: Picture Video Audio |
| 1124 | Picture | E3 | O | 0...N | Picture information Attributes: MIMEtype PictureURI |
| 1125 | MIMEtype | A | O | 0...1 | MIME type |
| 1126 | PictureURI | A | O | 0...1 | URI indicating position of Picture |
| 1127 | Video | E3 | O | 0...N | Picture information Attribute: MIMEtype VideoURI |

In Table 17, Fragment 1119, which is fragment information of a transmission object, indicates updated particular fragment information for a service guide, and allows a terminal to check corresponding ID and version information, receive only the updated fragment and store the received fragment.

FragmentID 1120 is a unique identification value of a fragment that the Terminal 208 will receive.

FragmentVersion 1121 indicates version information of the fragment to be received, and for the fragment having the same FragmentID, the corresponding version information is checked to determine whether the terminal has a FragmentID corresponding to the latest version. If there is the latest version in the session, the terminal receives the latest version value from the session and stores the received version value.

AlternativeURI 1122 represents a URI value with a corresponding object, in case that transmission through the session is failed or there is a need for reception not through a broadcast channel but through an interaction channel. The terminal can access a position of the corresponding URI through an interaction channel and receive a desired transmitted object.

MediaInformation 1123 indicates media information for generation of the notification message, and is needed for the notification message configured with multimedia. MediaInformation 1123 is composed of sub-element values of Picture, Video and Audio.

Picture 1124 indicates picture or image information, MIMEtype 1125 indicates a Multipurpose Internet Mail Extension (MIME) type for a corresponding moving image, PictureURI 1126 is a URI indicating a position of the picture or image, and Video 1127 indicates information on the moving image.

TABLE 18

| | | | | | |
|---|---|---|---|---|---|
| 1128 | MIMEtype | A | O | 0...1 | MIME type |
| 1129 | VideoURI | A | O | 0...1 | URI indicating position of Video |
| 1130 | Audio | E3 | O | 0...N | Picture information Attributes: MIMEtype AudioURI |
| 1131 | MIMEtype | A | O | 0...1 | MIME type |
| 1132 | AudioURI | A | O | 0...1 | URI indicating position of Audio |

In Table 18, MIMEtype 1128 indicates a MIME type for the corresponding moving image, and VideoURI 1129 is a URI indicating a position of the moving image. The "position of the moving image" refers to a position of a particular server when the corresponding moving image exists in the particular server rather than being included in the transmission notification message.

Audio 1130 indicates information on audio, music, and a bell sound, and MIMEtype 1131 indicates a MIME type for the corresponding audio, and AudioURI 1132 is a URI indicating a position of the audio.

Table 19 and Table 20 show a format of a message configured with text, which is a notification message schema used for user use according to a second embodiment of the present invention. A definition of each item in Table 19 and Table 20 is equal to that of Table 14, and a detailed description of the same parts as those of Table 14 to Table 18 will be omitted.

TABLE 19

| Number | Name | Type | Category | Cardinality | Description |
|---|---|---|---|---|---|
| 1200 | Notification | E1 | O | 0...N | Notification Message Fragment Contains the following attributes and elements. Attributes: id NotificationVersion NotificationType Validity |

TABLE 19-continued

| Number | Name | Type | Category | Cardinality | Description |
|---|---|---|---|---|---|
| | | | | | Elements: |
| | | | | | Name |
| | | | | | Description |
| | | | | | PresentationType |
| | | | | | ExtensionURL |
| 1201 | id | A | M | 1 | Notification message identifier |
| 1202 | NotificationVersion | A | M | 1 | Version information of Notification message |
| 1203 | NotificationType | A | M | 1 | Notification Type: |
| | | | | | if 0, UserUse |
| | | | | | if 1, TerminalUse |
| | | | | | ServiceProvider Defined possible |
| 1204 | Validity | A | O | 0 . . . 1 | Valid time of Fragment |
| 1205 | Name | E2 | M | 1 . . . N | Title of Notification Fragment |
| | | | | | Contains the following attribute. |
| | | | | | Lang |
| 1206 | Lang | A | O | 0 . . . 1 | Language |
| 1207 | Description | E2 | M | 1 . . . N | Content or description of Notification Message |
| 1208 | Lang | A | O | 0 . . . 1 | Language |

TABLE 20

| Number | Name | Type | Category | Cardinality | Description |
|---|---|---|---|---|---|
| 1209 | PresentationType | E2 | M | 1 | Definition of Presentation Type for Message |
| | | | | | PresentationType = 0: Terminal immediately displays notification message on screen upon receipt of it. |
| | | | | | PresentationType = 1: Terminal stores notification message in memory so that user can check it later. (Default) |
| | | | | | PresentationType = 2: Terminal displays notification message on existing ongoing service in an overlay fashion. |
| | | | | | If needed, it is possible to designate additional PresentationType. |
| 1210 | ExtensionURL | E2 | O | 0 . . . N | URL for additional information |

The notification message for user use, shown in Table 19 and Table 20, proposed in exemplary embodiments of the present invention, can be utilized for reception of public notices, advertisement messages, billing information, and payment information of the service provider or content provider, and ExtensionURL 1210 of Table 20, serving as CallbackURL, can receive additional information through an interaction channel.

The corresponding notification message includes attribute values of id 1201, NotificationVersion 1202, NotificationType 1203 and Validity 1204, and element values of Name 1205, Description 1207, PresentationType 1209 and ExtensionURL 1210. A description of all the sub-attribute values and sub-element values constituting the notification message shown in Table 19 and Table 20 is equal to the description of Table 14 to Table 18.

With reference to Table 21 to Table 23, a description will now be made of a format of a message configured with multimedia, which is a notification message schema used for user use according to the second embodiment of the present invention. For convenience, Table 21 to Table 23 are divided from one table. A definition of each item in Table 21 to Table 23 is equal to that of Table 14, and a detailed description of the same parts as those of Table 14 to Table 18 will be omitted.

TABLE 21

| Number | Name | Type | Category | Cardinality | Description |
|---|---|---|---|---|---|
| 1300 | Notification | E1 | O | 0 . . . N | Notification Message Fragment |
| | | | | | Contains the following attributes and elements. |
| | | | | | Attributes: |
| | | | | | |
| | | | | | id |
| | | | | | NotificationVersion |
| | | | | | NotificationType |
| | | | | | Validity |
| | | | | | Elements: |
| | | | | | |
| | | | | | Name |
| | | | | | Description |
| | | | | | PresentationType |
| | | | | | ExtensionURL |
| | | | | | MediaInformation |

TABLE 21-continued

| Number | Name | Type | Category | Cardinality | Description |
|---|---|---|---|---|---|
| 1301 | id | A | M | 1 | Notification message identifier |
| 1302 | NotificationVersion | A | M | 1 | Version information of Notification message |
| 1303 | NotificationType | A | M | 1 | NotificationType:<br>if 0, UserUse<br>if 1, TerminalUse<br>ServiceProvider Defined possible |
| 1304 | Validity | A | O | 0...1 | Validity time for using fragment |
| 1305 | Name | E2 | M | 1...N | Title of Notification Fragment<br>Contains the following attribute.<br>Lang |
| 1306 | Lang | A | O | 0...1 | Language |
| 1307 | Description | E2 | M | 1...N | Content or description of Notification Message |
| 1308 | Lang | A | O | 0...1 | Language |

TABLE 22

| | | | | | |
|---|---|---|---|---|---|
| 1309 | PresentationType | E2 | M | 1 | Definition of Presentation Type for Message<br>PresentationType = 0: Terminal immediately displays notification message on screen upon receipt of it.<br>PresentationType = 1: Terminal stores notification message in memory so that user can check it later. (Default)<br>PresentationType = 2: Terminal displays notification message on existing ongoing service in an overlay fashion.<br>If needed, it is possible to designate additional PresentationType. |
| 1310 | ExtensionURL | E2 | O | 0...N | URL for additional information |
| 1323 | MediaInformation | E2 | O | 0...1 | Media information for generation of Multimedia Notification Message<br>Elements:<br>Picture<br>Video<br>Audio |
| 1324 | Picture | E3 | O | 0...N | Picture information<br>Attributes:<br>MIMEtype<br>PictureURI |
| 1325 | MIMEtype | A | O | 0...1 | MIME type |
| 1326 | PictureURI | A | O | 0...1 | URI indicating position of Picture |

TABLE 23

| | | | | | |
|---|---|---|---|---|---|
| 1327 | Video | E3 | O | 0...N | Picture information<br>Attributes:<br>MIMEtype<br>VideoURI |
| 1328 | MIMEtype | A | O | 0...1 | MIME type |
| 1329 | VideoURI | A | O | 0...1 | URI indicating position of Video |
| 1330 | Audio | E3 | O | 0...N | Picture information<br>Attributes:<br>MIMEtype<br>AudioURI |
| 1331 | MIMEtype | A | O | 0...1 | MIME type |
| 1332 | AudioURI | A | O | 0...1 | URI indicating position of Audio |

Table 21 to Table 23 show a format of a message configured with multimedia, which is a notification message schema used for user use according to the second embodiment of the present invention. The notification message for user use, shown in Table 21 to Table 23, proposed in an exemplary embodiment of the present invention, helps configure a message using various multimedia files such as image, moving image, audio, etc., and can be variously utilized as an advertisement message for the service and content, and a message for public good, such as missing child search. The notification message of Table 21 to Table 23 includes the attribute values of id 1301, NotificationVersion 1302, NotificationType 1303 and Validity 1304, and the element values of Name 1305, Description 1307, PresentationType 1309, ExtensionURL 1310 and MediaInformation 1323. A description of all the sub-attribute values and sub-element values constituting the notification message shown in Table 21 to Table 23 is equal to the description of Table 14 to Table 18.

With reference to Table 24 to Table 26, a description will now be made of a format of a message including session information, which is a notification message schema used for terminal use according to the second embodiment of the present invention. For convenience, Table 24 to Table 26 are divided from one table, and a definition of items in each table follows that of Table 14.

TABLE 24

| Number | Name | Type | Category | Cardinality | Description |
|---|---|---|---|---|---|
| 1400 | Notification | E1 | O | 0...N | Notification Message Fragment<br>Contains the following attributes and elements. |

TABLE 24-continued

| Number | Name | Type | Category | Cardinality | Description |
|---|---|---|---|---|---|
| | | | | | Attributes: |
| | | | | | id |
| | | | | | NotificationVersion |
| | | | | | NotificationType |
| | | | | | Validity |
| | | | | | Elements: |
| | | | | | Name |
| | | | | | Description |
| | | | | | PresentationType |
| | | | | | ExtensionURL |
| | | | | | SessionInformation |
| 1401 | id | A | M | 1 | Notification message identifier |
| 1402 | NotificationVersion | A | M | 1 | Version information of Notification message |
| 1403 | NotificationType | A | M | 1 | Notification Type: if 0, UserUse if 1, TerminalUse ServiceProvider Defined possible |
| 1404 | Validity | A | O | 0...1 | Valid time of Fragment |
| 1405 | Name | E2 | M | 1...N | Title of Notification Fragment Contains the following attribute. Lang |
| 1406 | Lang | A | O | 0...1 | Language |
| 1407 | Description | E2 | M | 1...N | Content or description of Notification Message |
| 1408 | Lang | A | O | 0...1 | Language |

TABLE 25

| Number | Name | Type | Category | Cardinality | Description |
|---|---|---|---|---|---|
| 1409 | PresentationType | E2 | M | 1 | Definition of Presentation Type for Message PresentationType = 0: Terminal immediately displays notification message on screen upon receipt of it. PresentationType = 1: Terminal stores notification message in memory so that user can check it later. (Default) PresentationType = 2: Terminal displays notification message on existing ongoing service in an overlay fashion. If needed, it is possible to designate additional PresentationType. |
| 1410 | ExtensionURL | E2 | O | 0...N | URL for additional information |
| 1411 | SessionInformation | E2 | O | 0...N | Session information for data Attributes: ValidFrom ValidTo UsageType Elements: DeliverySession TransportObjectID Fragment AlternativeURI |
| 1412 | ValidFrom | A | O | 0...1 | Start time of session |
| 1413 | ValidTo | A | O | 0...1 | End time of session |
| 1414 | UsageType | A | O | 0...1 | Usage type of Session (for example, Service Guide, File Delivery, etc.) |

TABLE 26

| Number | Name | Type | Category | Cardinality | Description |
|---|---|---|---|---|---|
| 1415 | DeliverySession | E3 | M | 1 | Session information for delivery content Attributes: SourceIP TransportSessionID |
| 1416 | SourceIP | A | M | 1 | SourceIP address to be transmitted |
| 1417 | TransportSessionID | A | M | 1 | Session ID to be transmitted |
| 1418 | TransportObjectID | E3 | O | 0...N | ID for transmission Object |

TABLE 26-continued

| 1419 | Fragment | E3 | O | 0...N | Fragment information of transmission Object Attributes: FragmentID FragmentVersion |
| --- | --- | --- | --- | --- | --- |
| 1420 | FragmentID | A | O | 0...1 | ID value of Fragment |
| 1421 | FragmentVersion | A | O | 0...1 | Version information of Fragment |
| 1422 | AlternativeURI | A | O | 0...1 | |

Table 24 to Table 26 show a format of a message including session information, which is a notification message schema used for terminal use according to the second embodiment of the present invention. The typical usage of the notification message used for terminal use, shown in Table 24 to Table 26, is to provide update information of the service guide to the terminal so as to help the terminal to store the updated service guide. In addition, the notification message schema of Table 24 to Table 26 can be variously used for a start of the service or content, file download start, and delivery of a multimedia notification message transmitted through a separate session. Although it is stated that the typical usage of the notification message is to provide service guide update information to the terminal, other uses except for the above-stated uses can replace the typical use.

As to the separate session, the portable broadcast system generally opens a session with a multicast address to transmit content, and transmits the corresponding content to the terminal. In this case, when the terminal is already receiving content service from the portable broadcast system with a particular session, another separate session other than a previously established session is called the separate session.

The notification message for terminal use, shown in Table 24 to Table 26, proposed in the second embodiment of the present invention, includes the attribute values of id 1401, NotificationVersion 1402, NotificationType 1403 and Validity 1404, and the element values of Name 1405, Description 1407, PresentationType 1409, ExtensionURL 1410 and SessionInformation 1411. A description of all the sub-attribute values and sub-element values constituting the notification message shown in Table 24 to Table 26 is equal to the description of Table 14 to Table 18.

Figure 7:
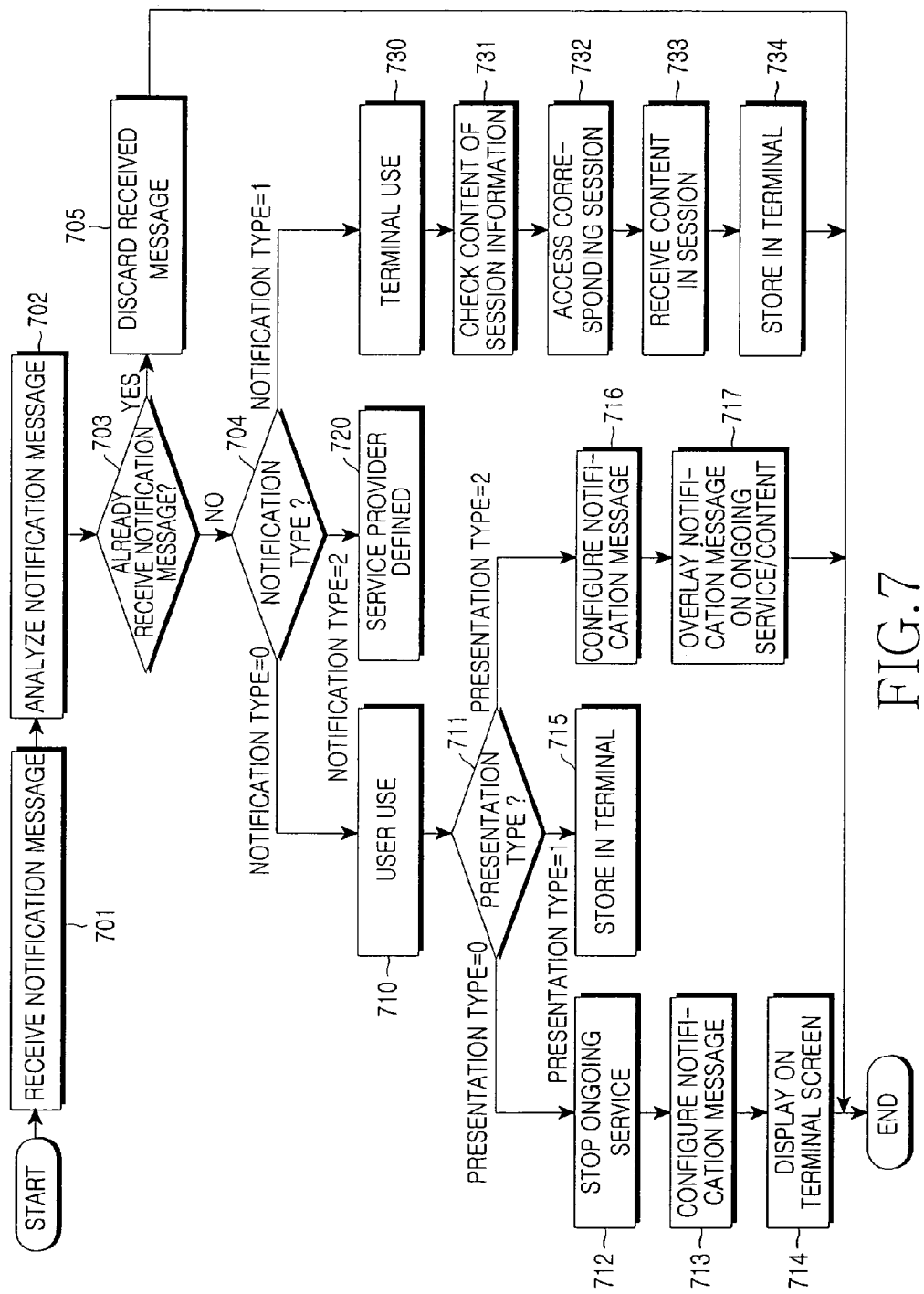
FIG. 7 is a flowchart illustrating a process of receiving a notification message in a terminal according to the second embodiment of the present invention.

FIG. 7 is a flowchart illustrating a process of receiving a notification message in a terminal according to a second embodiment of the present invention. The attribute values and element values for the notification message have been described above.

In step 701, a terminal receives a notification message from a portable broadcast system using a receiver 400. In step 702, a message paser 402 parses a corresponding message according to a format in which the received notification message is configured. If the notification message is configured in the XML format, the message parser 402 parses the received message using an XML parser included therein.

In step 703, a controller 404 determines whether the received notification message is an already received notification message, by comparing the previously received notification message with the newly received notification message in terms of id and NotificationVersion. If the newly received notification message is equal to the previously received notification message, the controller 404 proceeds to step 705 where it discards the newly received notification message, and then ends the process. However, if the newly received notification message is unequal to the previously received notification message, the controller 404 proceeds to step 704.

In step 704, the controller 404 checks NotificationType of the notification message parsed by the message parser 402, and performs a predefined operation according to the check result, and a description thereof will be made hereinbelow. If NotificationType is "0" indicating that the received notification message is for user use, the controller 404 proceeds to step 710. If NotificationType is "1" indicating that the received notification message is for terminal use, the controller 404 proceeds to step 730. If NotificationType is "2" or greater, indicating that the received notification message is a message defined by a service provider, the controller 404 proceeds to step 720 where it performs a specific operation defined by the service provider. Herein, when NotificationType is "2", the service provider can freely define the notification message according to their business model and service.

In step 710, the controller 404 can provide the received notification message to the user through a display 406 because the received notification message is a message received for user use. The notification message received for user use can be an SMS message or a multimedia message. With the use of this message, the service provider can provide various types of messages such as service event notification, system failure/checkup notice, text or multimedia advertisement for the service/content, disaster broadcast message, billing notice, etc. As for this notification message, the controller 404 checks PresentationType, and if the received notification message has high priority which is set according to the check result, the controller 404 outputs the received notification message through the display 406. The PresentationType can be freely defined according to the business model and service of the service provider, and will have a different value from the value defined above.

In step 711, the controller 404 should determine whether to handle the received notification message depending on the PresentationType of the received notification message. If the PresentationType of the received notification message is '0', the controller 404 determines that the received notification message is a message that should be urgently provided to the user. If the PresentationType is '1', the controller 404 stores the received notification message in a memory 410 so that the user can use it later. Finally, if the PresentationType is '2', the controller 404 overlays the corresponding notification message on the content in service.

If it is determined in step 711 that the PresentationType of the received notification message is '0' indicating that the corresponding message should be urgently sent to the user, the controller 404 proceeds to step 712 where it stops the ongoing service. In step 713, the controller 404 configures the received notification message such that it can be directly provided to the user. In step 714, the controller 404 displays the configured notification message through the display 406 according to a predefined screen configuration method. Herein, "configuring the received notification message" means, if the notification message is configured in the XML format, reconfiguring the message according to the predefined screen configuration method so as to provide such information as text, image, audio and video included in the message to the user.

If it is determined in step 711 that the PresentationType of the received notification message is '1', the controller 404 stores the notification message in the memory 410 in step 715. Later, the user can check the notification message stored in the memory 410 through a proper operation.

Finally, if it is determined in step 711 that the PresentationType of the received notification message is '2', the controller 404 reconfigures, in step 716, the notification message according to a screen configuration method defined by a Terminal 208 in order to overlay the received notification message on the ongoing service/content through the display 406.

In step 717, the controller 404 overlays the notification message generated in step 716 on the currently-received content, and provides the overlay results to the user through the display 406.

However, if it is determined in step 704 that the PresentationType of the received notification message is '1', the controller 404 determines in step 730 that the received notification message is for terminal use.

The controller 404 checks session information content of the received notification message in step 731, and accesses the corresponding session based on the session information content in step 732. The controller 404 receives the designated content such as service guide, file and object in the accessed session in step 733, and stores or updates the received content in the memory 410 in step 734.

Figure 8:
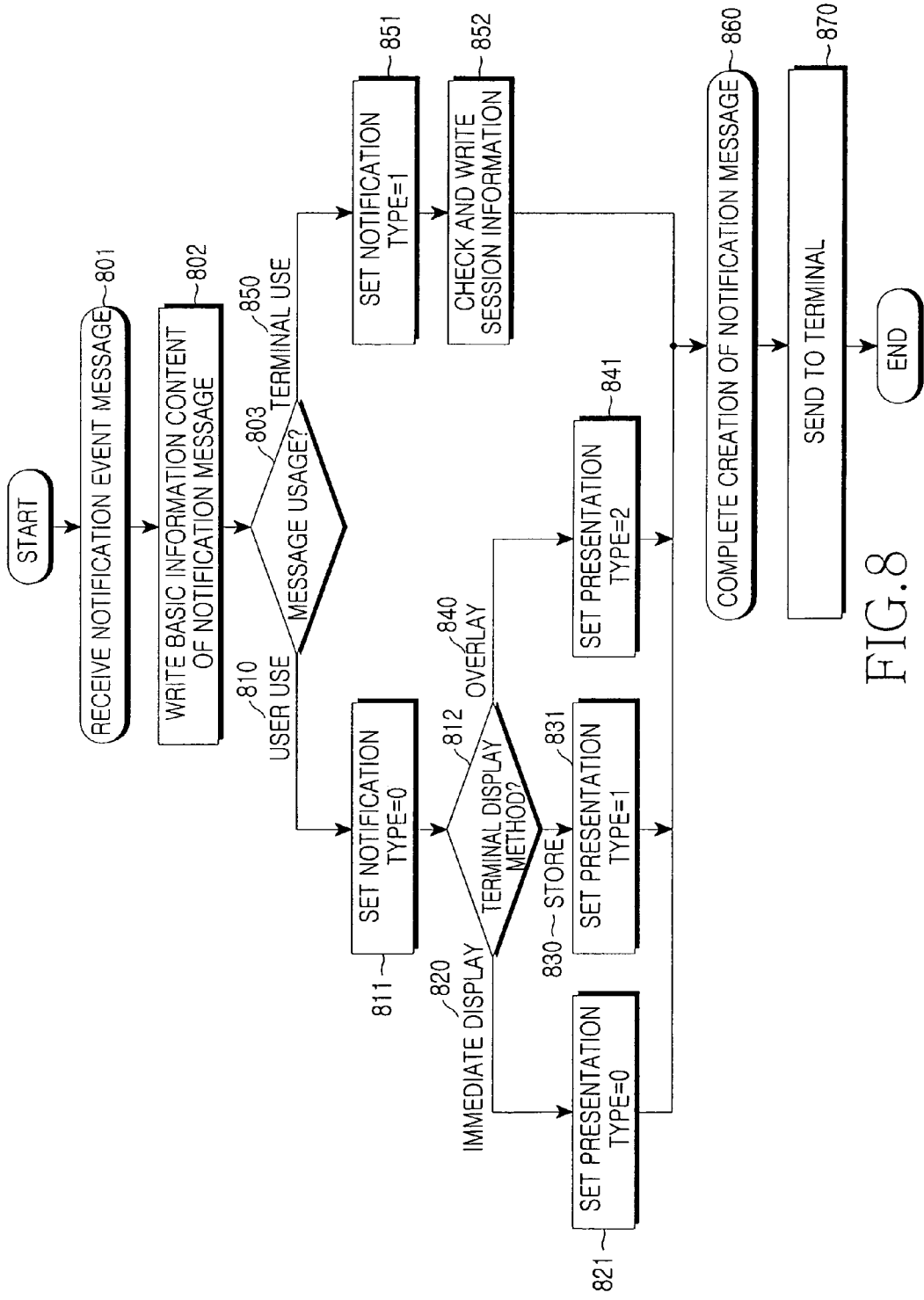
FIG. 8 is a flowchart illustrating a process of generating a notification message in a portable broadcast system according to the second embodiment of the present invention.

FIG. 8 is a flowchart illustrating a process of generating a notification message in a portable broadcast system according to a second embodiment of the present invention.

The element values and attribute values for the notification message described in FIG. 8 have been described with reference to Table 14 to Table 26.

The notification message is generated by the Notification Generation Function 204a described in FIG. 2 at the request of the content provider, service provider or network provider, or based on a notification event generated by the portable broadcast service system.

In step 801, the Notification Generation Function 204a receives from a Notification Event Function 202a a notification event message notifying change/failure of the system and service, change/delivery of a service guide, delivery of content, advertisement, emergency situation, emergency disaster, etc.

In step 802, based on the received notification event message, the Notification Generation Function 204a creates basic information for a notification message, i.e. attribute values of id and Validity, and element values of Name, Description, ExtensionURL, and MediaInformation.

In step 803, after creating the basic information, the Notification Generation Function 204a determines whether the corresponding notification message is for user use or for terminal use, and sets NotificationType according to the determination result.

If the notification message is for user use (810), the Notification Generation Function 204a sets NotificationType to "0" in step 811.

After setting NotificationType to "0" in step 811, the Notification Generation Function 204a determines in step 812 whether it will immediately display the corresponding message on the user terminal, store the corresponding message in the terminal to output it later at the user's request, or overlay the corresponding message on the content in service for the user.

If the Notification Generation Function 204a determines to immediately display the notification message upon receipt of it (820) in the process of determining a method for displaying the notification message on the terminal in step 812, it sets PresentationType of the notification message to "0" in step 821. However, if the Notification Generation Function 204a determines to store the notification message in the terminal to output it later at the user's request (830), it sets PresentationType to "1" in step 831.

Finally, if the Notification Generation Function 204a determines to overlay the notification message on the currently-provided content for the user (840), it sets PresentationType in the notification message to "2" in step 841.

However, if it is determined in step 803 that the notification message is for terminal use (850), the Notification Generation Function 204a sets NotificationType of the notification message to "1" in step 851.

In step 852, the notification message for terminal use, as described in the notification message format section, is used as a message notifying update/delivery of a service guide or delivery of service/content, and needs session information for the corresponding message. Therefore, in order to generate the terminal-use notification message, the Notification Generation Function 204a needs corresponding session information. The session information is stored in a BCAST Service Distribution/Adaptation 203, and as a Notification Distribution/Adaptation Function 203a of the BCAST Service Distribution/Adaptation 203 delivers the session information to the Notification Generation Function 204a, the Notification Generation Function 204a checks the session information and then sets the related information. The session information is written in elements 1111 to 1122 of Table 16 and Table 17 in the second embodiment.

After completion of setting for the notification message for user use or terminal use, the Notification Generation Function 204a configures the notification message in step 860. In step 870, the Notification Generation Function 204a transmits the generated notification message to the terminal via the Notification Distribution/Adaptation Function 203a.

Table 27 below is a notification message schema table provided for better understanding of the tables representing element values and attribute values constricting the notification message illustrated above, and the tables representing element values and attribute values constricting the notification message illustrated below.

TABLE 27

| Name | Type | Category | Cardinality | Description | DataType |
| --- | --- | --- | --- | --- | --- |

In Table 27, Name indicates a name of an element or an attribute constituting a corresponding fragment. Type indicates whether the name corresponds to an element value (E) or an attribute value (A). The element value includes E, E1 and E2. Category is used for indicating whether a corresponding element value or attribute value is mandatory or optional in the network (N) or the terminal (T), and has a value M if the value is mandatory, and a value O if the value is optional. Therefore, the mandatory content in the network is denoted by "NM (Network Mandatory)", the mandatory content in the terminal is denoted by "TM (Terminal Mandatory)", the optional content in the network is denoted by "NO (Network Optional)", and the optional content in the terminal is denoted by "TO (Terminal Optional)". Cardinality indicates relations between the elements, and has values of 0, 0 . . . 1, 1, 0 . . . n, 1 . . . n, where "0" means an optional relation, "1" means a mandatory relation, and 'n' means the possibility of having a plurality of values. For example, 0 . . . n means the possibility that there is no corresponding element value or there are n corresponding element values. Description defines the meaning of the corresponding element or attribute value. DataType means a data type for the corresponding element or attribute value, i.e. means a type of the program language used for generation of the message. For example, DataType can indicate a data type used in XML.

Table 28 to Table 36 show a notification message described in Table 27 according to a third embodiment of the present invention. The notification message according to the third embodiment is different from the notification message according to the first embodiment in that Category denotes whether the corresponding content is mandatory or optional in the network and terminal as described in Table 27. Also, among the element values, Name 1205 of Table 19, indicating a name of the notification message in the first and second embodiments, is replaced by Title in Table 29 below. In addition, while the first and second embodiments access a session using the session information included in the notification message and receive the corresponding file, the third embodiment adds ServiceGuideDeliveryDescriptor and Fragment to the notification message to use them for update of the service guide. The third embodiment is different from the earlier embodiments in that the NotificationType used for user use or terminal use is distinguished according to usage or event of the notification message.

The notification message of Table 28 to Table 36 basically includes attribute values of ID, NotificationVersion, NotificationType and Validity, and element values of Title, Description, PresentationType and ExtensionURL, and can further include SessionInformation, MediaInformation, ServiceGuideDeliveryDescriptor, or Fragment according to its usage.

TABLE 28

| Name | Type | Category | Cardinality | Description | Data Type |
|---|---|---|---|---|---|
| Notification Message | E | | | Notification Message Fragment Contains the following attributes: ID NotificationVersion NotificationType Validity Contains the following elements: Title Description PresentationType ExtensionURL SessionInformation MediaInformation ServiceGuideDeliveryDescriptor Fragment | |
| ID | A | NM/TM | 1 | Identifier of Notification Message | anyURI |
| Notification Version | A | NM/TM | 1 | Notification Message version information. It is to be used to check for Notification Message Redundancy and new Notification Messages. | int (32 bits) expressed as NTP time |
| Notification Type | A | NM/TM | 1 | Type of notification carried in this Notification Message. See section 8.2. | integer |
| Validity | A | NO/TM | 0 . . . 1 | Valid time of Notification message fragment. If Validity is specified, Notification message should be expired at the specified time. | int (32 bits) expressed as NTP time |

TABLE 29

| Title | E1 | NM/TM | 0 . . . N | Title of notification message, possibly in multiple languages. The language is expressed using built-in XML attribute xml:lang with this element. | string |
|---|---|---|---|---|---|
| Description | E1 | NO/TM | 0 . . . N | Description or Messages of Notification, possibly in multiple languages The language is expressed using built-in XML attribute xml:lang with this element | string |
| Presentation Type | E1 | NM/TM | 1 | Defines the type of presentation for received notification messages If PresentationType = 0, Terminal will immediately render the notification message after interrupting all the application. If PresentationType = 1, Terminal will | integer |

TABLE 29-continued

|   |   |   |   |   |   |   |
|---|---|---|---|---|---|---|
| | | | | store the notification message. User can see the stored message whenever he or she want. (Default) If PresentationType = 2, Terminal will render the notification message, overlaying the present playing services. Other PresentationTypes can be determined due to service providers, operators, or broadcasters' purpose | | |
| ExtensionURL | E1 | NO/TM | 0 . . . N | URL containing additional information related to notification message | | anyURI |

TABLE 30

| | | | | | | |
|---|---|---|---|---|---|---|
| SessionInformation | E1 | NO/TM | 0 . . . N | This element SHALL be present when the Notification Message carries pointer to another delivery session. SessionInformation defines the delivery session information, objects or fragments information delivered through the indicated session, and URI as alternative method for delivery. After receiving Notification Message with SessionInformation, Terminal would access the relevant session specified by SessionInformation and take a proper action like receiving content. Contains the following attributes: ValidFrom ValidTo UsageType Contains the following elements: DeliverySession TransportObjectID AlternativeURI | | |
| ValidFrom | A | NO/TM | 0 . . . 1 | The first moment when the session for terminal to receive data is valid. | | int (32 bits) expressed as NTP time |
| ValidTo | A | NO/TM | 0 . . . 1 | The last moment when the session for terminal to receive data is valid | | int (32 bits) expressed as NTP time |

TABLE 31

| | | | | | | |
|---|---|---|---|---|---|---|
| UsageType | A | NO/TM | 0 . . . 1 | Defines the type of the object transmitted through the indicated delivery session. If UsageType = 0, the indicated delivery session would be used for file delivery. If UsageType = 1, the service would start through the indicated delivery session at scheduled. Other PresentationType can be determined due to service providers, operators, or broadcasters' purpose | | integer |
| Delivery Session | E2 | NO/TM | 0 . . . 1 | Target delivery session information indicated by the notification message. Contains the following attributes: SourceIP TransportSessionID | | |
| SourceIP | A | NM/TM | 1 | Source IP address of the delivery session | | string |

TABLE 31-continued

| | | | | | | |
|---|---|---|---|---|---|---|
| Transport SessionID | A | NM/TM | 1 | Identifier of target delivery session | unsigned Short (16 bits) | |
| Transport ObjectID | E2 | NO/TM | 0 . . . N | The transport object ID (TOI) of the object transmitting through the indicated delivery session including the following Fragment Elements | unsigned Int(32 bits) | |
| Alternative URI | E2 | NO/TM | 0 . . . 1 | Alternative URI for receiving the object via the interaction channel. If terminal cannot access the indicated delivery session, terminal can be received the object associated with the notification message by AlternativeURI. | anyURI | |

TABLE 32

| | | | | | |
|---|---|---|---|---|---|
| Media Information | E1 | NO/TM | 0 . . . 1 | This element SHALL be present when the Notification Message carries information for rendering support of the notification. Media Information is used to construct and render notification messages. Contains the following elements: Picture Video Audio | |
| Picture | E2 | NO/TM | 0 . . . N | Defines how to obtain a picture and MIME type. Contains the following elements: MIMEtype PictureURI | |
| MIMEtype | A | NO/TM | 0 . . . 1 | MIME type of Picture | string |
| PictureURI | A | NO/TM | 0 . . . 1 | The URI referencing the picture | anyURI |
| Video | E2 | NO/TM | 0 . . . N | Defines how to obtain a video and MIME type. Contains the following elements: MIMEtype VideoURI | |
| MIMEtype | A | NO/TM | 0 . . . 1 | MIME type of Video | string |
| VideoURI | A | NO/TM | 0 . . . 1 | The URI referencing the video | anyURI |
| Audio | E2 | NO/TM | 0 . . . N | Defines how to obtain a audio and MIME type. Contains the following elements: MIMEtype AudioURI | |

TABLE 33

| | | | | | |
|---|---|---|---|---|---|
| MIMEtype | A | NO/TM | 0 . . . 1 | MIME type of Audio | string |
| AudioURI | A | NO/TM | 0 . . . 1 | The URI referencing the audio | anyURI |
| ServiceGuideDeliveryDescriptor | E1 | NO/TM | 0 . . . N | This element SHALL be present when the Notification Message carries SGDD. The Service Guide Delivery Descriptor Contains the following sub-element: DescriptorEntry | |
| id | A | NM/TM | 1 | ID of the Service Guide Delivery Descriptor fragment, globally unique | anyURI |
| version | A | NM/TM | 1 | Version of this fragment. The newer version overrides the older one as soon as it has been received. | unsigned Int (32 bits) |
| Descriptor Entry | E2 | NM/TM | 1 . . . N | An entry in the Service Guide Delivery Descriptor. Contains the following sub-elements: GroupingCriteria, Transport, AlternativeAccessURL, ServiceGuideDeliveryUnit | |

TABLE 33-continued

| | | | | | |
|---|---|---|---|---|---|
| GroupingCriteria | E3 | NO/TM | 0...1 | Specifies the criteria for grouping Service Guide fragments in this Service Guide DescriptorEntry. If several criteria for grouping are present at the same time, all those grouping criteria apply to the set of Service Guide fragments in this Service Guide DescriptorEntry. Contains the following sub-elements: TimeGroupingCriteria, GenreGroupingCriteria, ServiceProviderCriteria | |

TABLE 34

| | | | | | |
|---|---|---|---|---|---|
| TimeGroupingCriteria | E4 | NO/TM | 0...1 | Specifies the period of time this DescriptorEntry describes. (For example: declares a certain subgroup of valid Service Guide fragments for next 2 hours) Contains the following attributes: StartTime, EndTime | |
| StartTime | A | NM/TM | 1 | Start of the time period this DescriptorEntry declares fragments for. (Note: this is different than fragment validity time) | int (32 bit) expressed as NTP time |
| EndTime | A | NM/TM | 1 | End of the time period this DescriptorEntry declares fragments for. (Note: this is different than fragment validity time) | int (32 bit) expressed as NTP time |
| GenreGroupingCriteria | E4 | NO/TM | 0...1 | Specifies the classification of the services/content associated with the fragments in this Service Guide Delivery Unit (e.g. comedy, action, drama) | string |
| ServiceProviderCriteria | E4 | NO/TM | 0...1 | Specifies the each service provider by unique name. | string |
| Transport | E3 | NO/TM | 0...1 | The pointer to the transport session delivering the Service Guide fragments within Service Guide Delivery Units announced in this DescriptorEntry. Contains the following attributes: IpAddress, Port, SrcIpAddress, SessionID | |
| IpAddress | A | NM/TM | 1 | Destination IP address of the target delivery session | string |
| Port | A | NM/TM | 1 | Destination port of target delivery session | unsigned Short (16 bits) |
| SrcIpAddress | A | NO/TM | 0...1 | Source IP address of the delivery session | string |

TABLE 35

| | | | | | |
|---|---|---|---|---|---|
| SessionID | A | NM/TM | 1 | Identifier of target delivery session | unsigned Short (16 bits) |
| AlternativeAccessURL | E3 | NO/TM | 0...N | Alternative URL for retrieving the Service Guide delivery units via the interaction channel | anyURI |
| ServiceGuideDeliveryUnit | E3 | NM/TM | 1...N | A group of fragments. Contains the following attributes: transportObjectID, validFrom, validTo Contains the following sub-element: Fragment | |

TABLE 35-continued

| | | | | | | |
|---|---|---|---|---|---|---|
| transportObjectID | | A | NO/TM | 0 . . . 1 | The transport object ID of the Service Guide Delivery Unit carrying the declared fragments within this group. | unsigned Int (32 bits) |
| validFrom | | A | NO/TM | 0 . . . 1 | The first moment of time this group of Service Guide fragments is valid. The format is NTP. Note: If this attribute is not present, "validFrom" attribute MUST be present in the "Fragment" sub-element. | int (32 bit) expressed as NTP time |
| validTo | | A | NO/TM | 0 . . . 1 | The last moment of time this group of Service Guide fragments is valid. The format is NTP. Note: If this attribute is not present, "validTo" attribute MUST be present in the "Fragment" sub-element. | int (32 bit) expressed as NTP time |
| Fragment | | E4 | NM/TM | 1 . . . N | Declaration of Service Guide fragment that is available over broadcast channel. Contains the following attributes: transportID, id, version, validFrom, validTo, type | |

TABLE 36

| | | | | | | |
|---|---|---|---|---|---|---|
| transportID | A | NM/TM | 1 | | The identifier of the announced Service Guide fragment to be used in the Service Guide Delivery Unit header. | unsigned Int (32 bits) |
| id | A | NM/TM | 1 | | The identifier of the announced Service Guide fragment. | anyURI |
| version | A | NM/TM | 1 | | The version of the announced Service Guide fragment. Note: The scope of the version is limited to the given transport session. The value of version turn over from $2^{32} - 1$ to 0. | unsigned Int (32 bits) |
| validFrom | A | NO/TM | 0 . . . 1 | | The first moment when this fragment is valid. If not given, the validity is assumed to have started at some time in the past. Note: If this attribute is present and "validFrom" attribute of "ServiceGuideDeliveryUnit" is also present, the value of this attribute overrides the value of "ServiceGuideDeliveryUnit" attribiute "validFrom". | int (32 bit) expressed as NTP time |
| validTo | A | NO/TM | 0 . . . 1 | | The last moment when this fragment is valid. If not given, the validity is assumed to end in undefined time in the future. Note: If this attribute is present and "validTo" attribute of "ServiceGuideDeliveryUnit" is also present, the value of this attribute overrides the value of "ServiceGuideDeliveryUnit" attribute "validTo". | int (32 bit) expressed as NTP time |
| type | A | NM/TM | 1 | | Enumeration value designating the schema or MIME type for fragment. | string |
| Fragment | E1 | NO/TM | 0 . . . N | | This element SHALL be present when the Notification Message carries Service Guide fragment. This element may carry any Service Guide fragment. | <TBD> |

Table 37 to Table 45 below show a notification message according to a fourth embodiment of the present invention. A difference between the notification message according to the fourth embodiment and the notification message according to the other embodiments is as follows. A terminal determines whether the corresponding notification message is for user use or for terminal use depending on NotificationType. A Notification Generation Function 204a configures a message according to an event type (added) of the notification message using EventType indicating a type of a notification event. The terminal can determine by what event the received notification message is configured, depending on EventType of the received notification message. In addition, the Notification Generation Function 204a adds FilteringValue to the notification message so as to display the content stored in the user terminal or the content existing in a particular session and the content corresponding to the FilteringValue so that the users can view different content. That is, as the Notification Generation Function 204a generates a notification message according to a received notification event message, it is possible to configure the notification message including only the element necessary for the notification message by including, in the transmission notification message, EventType information indicating a type of event for allowing the Notification Generation Function 204a to generate a notification message.

In addition, although the fourth embodiment can send ServiceGuideDeliveryDescriptor (SGDD) or Fragment itself for an update purpose of the service guide, it can access, during generation of a notification message, a corresponding session through id, version information and session information for the SGDD, find an SGDD matched to the notified id from the SGDDs existing in the accessed session, and update the service guide when the version information indicates the latest version.

Generic Field of the notification message according to the fourth embodiment includes attribute values of ID, NotificationVersion, NotificationType, EventType, PresentationType and Validity, and element values of Title, Description and ExtensionURL. FilteringValue, SessionInformation, MediaInformation, ServiceGuideDeliveryDescriptor and Fragment, together with Generic Field, can be configured in different way according to EventType.

TABLE 37

| Name | Type | Category | Cardinality | Description | Data Type |
|---|---|---|---|---|---|
| Notification Message | E | | | Notification Message Fragment Contains the following attributes: ID NotificationVersion NotificationType EventType PresentationType Validity Contains the following elements: Title Description ExtensionURL FilteringValue SessionInformation MediaInformation ServiceGuideDeliveryDescriptor Fragment | |
| ID | A | NM/TM | 1 | Identifier of Notification Message | anyURI |
| Notification Version | A | NM/TM | 1 | Notification Message version information. It is to be used to check for Notification Message Redundancy and new Notification Messages. | int (32 bits) expressed as NTP time |

TABLE 38

| | | | | | |
|---|---|---|---|---|---|
| Notification Type | A | NM/TM | 1 | Notification Type: If NotificationType = 0, this message is user-oriented message, such as notice from SP, Multimedia message, emergency, etc. If NotificationType = 1, this message is terminal-oriented message, such as start of service or file download, etc. Other NotificationType can be determined due to service providers, operators, or broadcasters' purpose | unsigned Byte |
| EventType | A | NM/TM | 1 | Type of notification event carried in this notification message. | unsigned Byte |
| Presentation Type | A | NM/TM | 1 | Defines the type of presentation for received notification messages If PresentationType = 0, Terminal will immediately render the notification message after interrupting all the application. If PresentationType = 1, Terminal will store the notification message. User can see the stored message whenever he or she want. (Default) If PresentationType = 2, Terminal will render the notification message, overlaying the present playing services. Other PresentationTypes can be determined due to service providers, operators, or broadcasters' purpose | unsigned Byte |

TABLE 38-continued

| | | | | | |
|---|---|---|---|---|---|
| Validity | A | NO/TM | 0...1 | Valid time of Notification message fragment.<br>If Validity is specified, Notification message should be expired at the specified time.<br>Note: If notification message is used for advertisement notification, and this field is present, it SHALL be used to specify the start time of the advertisement. | int (32 bits) expressed as NTP time |

TABLE 39

| | | | | | |
|---|---|---|---|---|---|
| Title | E1 | NO/TM | 0...N | Title of notification message, possibly in multiple languages.<br>The language is expressed using built-in XML attribute xml:lang with this element. | string |
| Description | E1 | NO/TM | 0...N | Description or Messages of Notification, possibly in multiple languages<br>The language is expressed using built-in XML attribute xml:lang with this element | string |
| Extension URL | E1 | NO/TM | 0...N | URL containing additional information related to notification message | anyURI |
| FilteringValue | E1 | NO/TO | 0...N | Defines the value to be used for filtering. | String |
| FilteringType | A | NM/TM | 1 | Defines the filter type. Possible types are Genre, Age, Name, Location, etc. | String |
| SessionInformation | E1 | NO/TM | 0...N | This element SHALL be present when the Notification Message carries pointer to another delivery session. SessionInformation defines the delivery session information, objects or fragments information delivered through the indicated session, and URI as alternative method for delivery. After receiving Notification Message with SessionInformation, Terminal would access the relevant session specified by SessionInformation and take a proper action like receiving content.<br>Contains the following attributes:<br>ValidFrom<br>ValidTo<br>UsageType<br>Contains the following elements:<br>DeliverySession<br>TransportObjectID<br>AlternativeURI | |

TABLE 40

| | | | | | |
|---|---|---|---|---|---|
| ValidFrom | A | NO/TM | 0...1 | The first moment when the session for terminal to receive data is valid. | int (32 bits) expressed as NTP time |
| ValidTo | A | NO/TM | 0...1 | The last moment when the session for terminal to receive data is valid | int (32 bits) expressed as NTP time |
| Delivery Session | E2 | NO/TM | 0...1 | Target delivery session information indicated by the notification message.<br>Contains the following attributes:<br>SourceIP<br>TransportSessionID | |

TABLE 40-continued

| Name | Type | Category | Cardinality | Description | Data Type |
|---|---|---|---|---|---|
| SourceIP | A | NM/TM | 1 | Source IP address of the delivery session | string |
| TransportSessionID | A | NM/TM | 1 | Identifier of target delivery session | unsigned Short (16 bits) |
| TransportObjectID | E2 | NO/TM | 0...N | The transport object ID (TOI) of the object transmitting through the indicated delivery session including the following Fragment Elements | unsigned Int(32 bits) |
| AlternativeURI | E2 | NO/TM | 0...1 | Alternative URI for receiving the object via the interaction channel. If terminal cannot access the indicated delivery session, terminal can be received the object associated with the notification message by AlternativeURI. | anyURI |
| Media Information | E1 | NO/TM | 0...1 | This element SHALL be present when the Notification Message carries information for rendering support of the notification. Media Information is used to construct and render notification messages. Contains the following elements: Picture Video Audio | |

TABLE 41

| Name | Type | Category | Cardinality | Description | Data Type |
|---|---|---|---|---|---|
| Picture | E2 | NO/TM | 0...N | Defines how to obtain a picture and MIME type. Contains the following elements: MIMEtype PictureURI | |
| MIMEtype | A | NO/TM | 0...1 | MIME type of Picture | string |
| PictureURI | A | NO/TM | 0...1 | The URI referencing the picture | anyURI |
| Video | E2 | NO/TM | 0...N | Defines how to obtain a video and MIME type. Contains the following elements: MIMEtype VideoURI | |
| MIMEtype | A | NO/TM | 0...1 | MIME type of Video | string |
| VideoURI | A | NO/TM | 0...1 | The URI referencing the video | anyURI |
| Audio | E2 | NO/TM | 0...N | Defines how to obtain a audio and MIME type. Contains the following elements: MIMEtype AudioURI | |
| MIMEtype | A | NO/TM | 0...1 | MIME type of Audio | string |
| AudioURI | A | NO/TM | 0...1 | The URI referencing the audio | anyURI |
| ServiceGuideDeliveryDescriptor | E1 | NO/TM | 0...N | This element SHALL be present when the Notification Message carries SGDD. The Service Guide Delivery Descriptor Contains the following sub-element: DescriptorEntry | |

TABLE 42

| Name | Type | Category | Cardinality | Description | Data Type |
|---|---|---|---|---|---|
| id | A | NM/TM | 1 | ID of the Service Guide Delivery Descriptor fragment, globally unique | anyURI |
| version | A | NM/TM | 1 | Version of this fragment. The newer version overrides the older one as soon as it has been received. | unsigned Int (32 bits) |

TABLE 42-continued

| | | | | | |
|---|---|---|---|---|---|
| Descriptor Entry | E2 | NO/ TM | 1...N | An entry in the Service Guide Delivery Descriptor. Contains the following sub-elements: GroupingCriteria, Transport, AlternativeAccessURL, ServiceGuideDeliveryUnit | |
| GroupingCriteria | E3 | NO/ TM | 0...1 | Specifies the criteria for grouping Service Guide fragments in this Service Guide DescriptorEntry. If several criteria for grouping are present at the same time, all those grouping criteria apply to the set of Service Guide fragments in this Service Guide DescriptorEntry. Contains the following sub-elements: TimeGroupingCriteria, GenreGroupingCriteria, ServiceProviderCriteria | |
| TimeGroupingCriteria | E4 | NO/ TM | 0...1 | Specifies the period of time this DescriptorEntry describes. (For example: declares a certain subgroup of valid Service Guide fragments for next 2 hours) Contains the following attributes: StartTime, EndTime | |
| StartTime | A | NM/ TM | 1 | Start of the time period this DescriptorEntry declares fragments for. (Note: this is different than fragment validity time) | int (32 bit) expressed as NTP time |

TABLE 43

| | | | | | |
|---|---|---|---|---|---|
| EndTime | A | NM/ TM | 1 | End of the time period this DescriptorEntry declares fragments for. (Note: this is different than fragment validity time) | int (32 bit) expressed as NTP time |
| GenreGroupingCriteria | E4 | NO/ TM | 0...1 | Specifies the classification of the services/content associated with the fragments in this Service Guide Delivery Unit (e.g. comedy, action, drama) | string |
| ServiceProviderCriteria | E4 | NO/ TM | 0...1 | Specifies the each service provider by unique name. | string |
| Transport | E3 | NO/ TM | 0...1 | The pointer to the transport session delivering the Service Guide fragments within Service Guide Delivery Units announced in this DescriptorEntry. Contains the following attributes: IpAddress, Port, SrcIpAddress, SessionID | |
| IpAddress | A | NM/ TM | 1 | Destination IP address of the target delivery session | string |
| Port | A | NM/ TM | 1 | Destination port of target delivery session | unsigned Short (16 bits) |
| SrcIpAddress | A | NO/ TM | 0...1 | Source IP address of the delivery session | string |
| SessionID | A | NM/ TM | 1 | Identifier of target delivery session | unsigned Short (16 bits) |
| Alternative AccessURL | E3 | NO/ TM | 0...N | Alternative URL for retrieving the Service Guide delivery units via the interaction channel | anyURI |

TABLE 44

| ServiceGuideDelivery Unit | E3 | NM/ TM | 1 ... N | A group of fragments. Contains the following attributes: transportObjectID, validFrom, validTo Contains the following sub-element: Fragment | |
|---|---|---|---|---|---|
| transportObjectID | A | NO/ TM | 0 ... 1 | The transport object ID of the Service Guide Delivery Unit carrying the declared fragments within this group. | unsigned Int (32 bits) |
| validFrom | A | NO/ TM | 0 ... 1 | The first moment of time this group of Service Guide fragments is valid. The format is NTP. Note: If this attribute is not present, "validFrom" attribute MUST be present in the "Fragment" sub-element. | int (32 bit) expressed as NTP time |
| validTo | A | NO/ TM | 0 ... 1 | The last moment of time this group of Service Guide fragments is valid. The format is NTP. Note: If this attribute is not present, "validTo" attribute MUST be present in the "Fragment" sub-element. | int (32 bit) expressed as NTP time |
| Fragment | E4 | NM/ TM | 1 ... N | Declaration of Service Guide fragment that is available over broadcast channel. Contains the following attributes: transportID, id, version, validFrom, validTo, type | |
| transportID | A | NM/ TM | 1 | The identifier of the announced Service Guide fragment to be used in the Service Guide Delivery Unit header. | unsigned Int (32 bits) |

TABLE 45

| id | A | NM/ TM | 1 | The identifier of the announced Service Guide fragment. | anyURI |
|---|---|---|---|---|---|
| version | A | NM/ TM | 1 | The version of the announced Service Guide fragment. Note: The scope of the version is limited to the given transport session. The value of version turn over from $2^{32} - 1$ to 0. | unsigned Int (32 bits) |
| validFrom | A | NO/ TM | 0 ... 1 | The first moment when this fragment is valid. If not given, the validity is assumed to have started at some time in the past. Note: If this attribute is present and "validFrom" attribute of "ServiceGuideDeliveryUnit" is also present, the value of this attribute overrides the value of "ServiceGuideDeliveryUnit" attribiute "validFrom". | int (32 bit) expressed as NTP time |
| validTo | A | NO/ TM | 0 ... 1 | The last moment when this fragment is valid. If not given, the validity is assumed to end in undefined time in the future. Note: If this attribute is present and "validTo" attribute of "ServiceGuideDeliveryUnit" is also present, the value of this attribute overrides the value of "ServiceGuideDeliveryUnit" attribute "validTo". | int (32 bit) expressed as NTP time |
| type | A | NM/ TM | 1 | Enumeration value designating the schema or MIME type for fragment. | string |
| Fragment | E1 | NO/ TM | 0 ... N | This element SHALL be present when the Notification Message carries Service Guide fragment. This element may carry any Service Guide fragment. | <TBD> |

Table 46 below shows values used in NotificationType of the third embodiment and EventType of the fourth embodiment. The notification message format of the third or fourth embodiment is subject to change according to the EventType. For EventType=1, the notification message can be configured with Generic Field+MediaInformation. For EventType=2, when there is an intention to show the related advertisement or content stored in the terminal through Filtering, the notification message can be configured with Generic Field+FilteringValue. In order to send advertisement content in a particular session to allow the user to access the corresponding session and view the advertisement in real time, the notification message can be configured with Generic Field+SessionInformation, or can also be configured with Generic Field+FilteringValue+SessionInformation such that the user can view an advertisement matched to him or her through FilteringValue during the corresponding session.

For EventType=3, the notification message is configured with Generic Field+SessionInformation to transmit the session where the corresponding service or file will be transmitted, in order to indicate a start of the service or file delivery. For EventType=4, to notify only the session where there is a service guide updated to indicate update of the service guide, the notification message can be configured with Generic Field+Session Information, and it is also possible to deliver a corresponding ServiceGuideDelieveryDescriptor along with Generic Field+ServiceGuideDeliveryDescriptor using the notification message, or configure a modified Fragment itself like Generic Field+Fragment.

In addition, when there are several SGDDs in Announcement Session where the SGDD is transmitted, the notification message is configured with version+SessionInformation and id of Generic Field+ServiceGuideDeliveryDescriptor together to notify a changed particular SGDD in the session, enabling update of the corresponding SGDD. For EventType=5, the notification message is configured only with Generic Field. For EventType=6, the notification message is configured in the form of Generic Field+MediaInformation, and then delivered to the terminal. As to EventType of Table 46, various EventTypes can be added according to usage.

TABLE 46

| EventType | Name | Description |
|---|---|---|
| 1 | Emergency notification | To announce emergency messages to users. |
| 2 | Advertisement | To signal advertisement insertion to terminals. |
| 3 | Service availability announcement | To announce service availability to users. |
| 4 | Service Guide update | To announce Service Guide updates to users. |
| 5 | Text message | To announce text-based notifications to users. |
| 6 | Multimedia message | To announce multimedia-based notification to users. |

Figure 9:
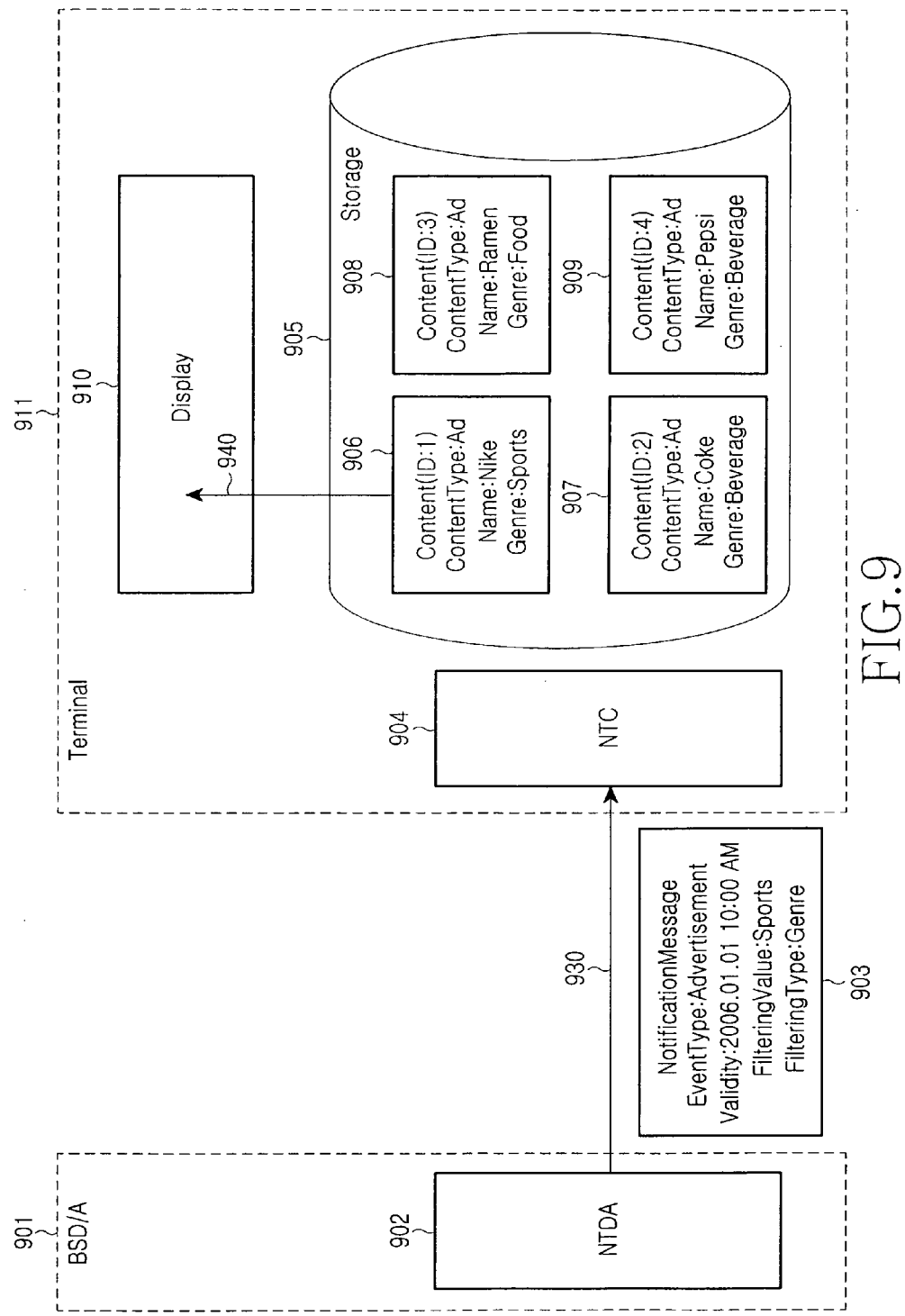
FIG. 9 is a diagram illustrating an exemplary process in which upon receipt of a notification message used for the purpose of advertisement or the like according to the fourth embodiment of the present invention, a terminal provides previously stored advertisement content or data to the user.

FIG. 9 is an exemplary process in which upon receipt of a notification message used for the purpose of advertisement or the like according to the fourth embodiment of the present invention, a terminal provides previously stored advertisement content or data to the user.

That is, the drawing shows a process in which when an advertisement message with EventType=2 includes FilteringValue, the user terminal displays on its screen the previously stored advertisement content or its similar data using the FilteringValue. A Broadcast Service Distribution/Adaptation (BSD/A) 901 is a Network Entity for managing Distribution in OMA BCAST, and a Notification Distribution/Adaptation (NTDA) 902 is a component of a notification function for delivering a notification message in the BSD/A 901.

The NTDA 902 delivers a notification message 903 with EventType=Advertisement, FilteringType=Genre, and FilteringValue=Sports from the OMA BLAST to an NTC 904 of a Terminal 911 via an interface 930 defined between the BSD/A 901 and the Terminal 911.

The NTC 904 checks the received notification message, and searches for the Content with Genre=Sports among the content 906 to 909 stored in a Storage 905 using an appropriate function in the Terminal 911. In this example, because Content (ID: 1) 906 corresponds to the advertisement content matched to FilteringValue of the received notification message 903, the content is displayed on a Display 910 through an interface 940. Because Validity in the received notification message is defined as 2006.01.01 10:00 AM, the corresponding content will be automatically displayed at 10:00 AM.

FilteringValue and FilteringType described in the fourth embodiment can be allocated various values according to their usage, and the main Types can include User Preference, User Location, Target Group, Service Provider, User demographic profile, Time of day, day of week, channel, etc. In addition, a corresponding Type should be used with the same name if it is used with the same usage or content as the content of the element values or attribute values describing the Fragment associated with the content or service of the service guide. The element values and the attribute values used in the Fragment associated with the content or service include Genre, ParentalRating, UserRating, TargetUserProfile, BroadcastArea, etc.

As to the FilteringType and FilteringValue in the above embodiments, FilteringType may be used with the same usage and function in terms of Title, and FilteringValue may be used with the same usage and function in terms of Description.

Although certain exemplary embodiments of the present invention have been described only for the portable broadcast system in the first to fourth embodiments of the present invention, exemplary embodiments of the present invention can actually be applied to any IP-based broadcast system.

As can be understood from the foregoing description, in the broadcast or communication system capable of portable broadcast, exemplary embodiments of the present invention divide notification messages into a notification message for user use and a notification message for terminal use according to usage so as to enable the terminal to perform a necessary operation spontaneously without a separate operation of the user, making it possible to update the service guide or perform file downloading without user's manipulation. For the notification message for user use, PresentationType is separately defined in the message thereby to give priority to the message. If the corresponding message is an urgent notification message, the terminal can stop the corresponding content service, and provide the received notification message to the user.

In addition, the terminal checks version information of the notification message in the process of receiving the notification message from the portable broadcast system, and discards the corresponding notification message if the message is a duplicated notification message, and performs the corresponding operation only when the corresponding notification message is a new notification message, thereby reducing unnecessary operation of the terminal.

Exemplary embodiments of the present invention may be embodied in a general-purpose computer by running a program from a computer-readable medium, including but not limited to storage media such as magnetic storage media (ROMs, RAMs, floppy disks, magnetic tapes, etc.), optically readable media (CD-ROMs, DVDs, etc.), and carrier waves (transmission over the interne).

Moreover, exemplary embodiments of the present invention can specifically configure the notification message according to EventType, and add FilteringValue to the notification message to display the content stored in the terminal for every user in a different way, thereby facilitating customization for the content and dynamically displaying the desired content.

While certain exemplary embodiments of the invention have been shown and described herein, it will be understood by those skilled in the art that various changes in form and details may be made therein without departing from the spirit and scope of the invention as defined by the appended claims and their equivalents.

What is claimed is:

1. A terminal apparatus for receiving a broadcast service from a broadcasting system, the apparatus comprising;
    a receiver for receiving a notification message from the broadcasting system; and
    a controller for determining, based on content of the notification message, whether the received notification message is a notification message to be used by a user or to be used by the terminal;
    wherein the terminal apparatus performs any one of an operation of checking a PresentationType of the notification message if the notification message is a notification message to be used by the user, and an operation of checking a SessionInformation of the notification message to access a corresponding session if the notification message is a notification message to be used by the terminal.

2. The terminal apparatus of claim 1, wherein the controller compares a NotificationVersion included in the received notification message with a NotificationVersion included in a previously received notification message to determine whether the received notification message is a new notification message, and discards the received notification message if the received notification message is not a new notification message.

3. The terminal apparatus of claim 1, wherein the controller checks NotificationType information of the received notification message to determine whether the received notification message is a notification message to be used by the user or a notification message to be used by the terminal.

4. The terminal apparatus of claim 1, wherein the controller checks PresentationType information of the received notification message, and controls a display operation of the received notification message according to a check result.

5. The terminal apparatus of claim 4, wherein if the PresentationType information of the received notification message is '0', the controller performs a control operation of outputting the notification message through a display immediately upon receipt of the notification message.

6. The terminal apparatus of claim 4, wherein if the PresentationType information of the received notification message is '1', the controller performs a control operation of storing the notification message in a memory.

7. The terminal apparatus of claim 4, wherein if the PresentationType information of the received notification message is '2', the controller performs a control operation of overlaying the notification message on an ongoing service and outputting an overlay result through a display.

8. The terminal apparatus of claim 1, wherein the controller checks a UsageType indicating usage of a SessionInformation in the notification message, and controls a session access unit so that it accesses a session according to the usage.

9. The terminal apparatus of claim 1, wherein the controller checks an EventType of the notification message, and performs a corresponding operation according to the EventType of the received notification message.

10. The terminal apparatus of claim 1, wherein the controller checks a FilteringValue of the notification message, and provides the user with the content whose FilteringValue is equal to the FilteringValue among the content previously stored in the terminal.

11. A method comprising the steps of:
    receiving, by a terminal, a notification message from a broadcasting system;
    determining, based on content of the notification message, whether the notification message is a notification message to be used by a user or to be used by the terminal; and
    performing any one of an operation of checking a PresentationType of the notification message if the notification message is a notification message to be used by the user, and an operation of checking a SessionInformation of the notification message to access a corresponding session if the notification message is a notification message to be used by the terminal.

12. The method of claim 11, wherein the step of determining whether the received notification message is a notification message to be used by a user or a notification message to be used by the terminal comprises the step of determining that the received notification message is a notification message to be used by a user if NotificationType information of the notification message is '0', and determining that the received notification message is a notification message to be used by the terminal if the NotificationType information of the notification message is '1'.

13. The method of claim 11, further comprising the steps of:
    comparing a NotificationVersion of the received notification message with a NotificationVersion of a previously received notification message; and
    discarding the received notification message if the received notification message is not a new notification message as a result of the comparison.

14. The method of claim 12, further comprising the step of checking PresentationType information of the notification message if the received notification message is the notification message to be used by a user.

15. The method of claim 14, further comprising the step of outputting the received notification message to the user immediately upon receipt of the notification message, if the PresentationType information of the notification message is '0'.

16. The method of claim 14, further comprising the step of storing the received notification message in a memory if the PresentationType information of the notification message is '1'.

17. The method of claim 14, further comprising the step of overlaying the received notification message on an ongoing service and outputting an overlay result to the user if the PresentationType information of the notification message is '2'.

18. The method of claim 11, further comprising the step of checking a UsageType indicating usage of a SessionInformation of the received notification message, and accessing a session according to the usage of the SessionInformation.

19. The method of claim 11, further comprising the step of checking an EventType of the notification message in order to discover content included in the received notification message.

20. The method of claim 11, further comprising the steps of:

checking a FilteringValue of the received notification message; and providing the user with the content whose FilteringValue is equal to the FilteringValue among the previously stored content.

* * * * *

UNITED STATES PATENT AND TRADEMARK OFFICE
CERTIFICATE OF CORRECTION

PATENT NO.         : 8,103,209 B2                                      Page 1 of 1
APPLICATION NO.    : 12/805695
DATED              : January 24, 2012
INVENTOR(S)        : Jung et al.

It is certified that error appears in the above-identified patent and that said Letters Patent is hereby corrected as shown below:

Title page,
item (30) Foreign Application Priority Data should read as follows:
    August 17, 2005 (KR) -------------------------- 2005-75459
    October 8, 2005 (KR) -------------------------- 2005-94678
    January 14, 2006 (KR) ------------------------ 2006-4195

Signed and Sealed this
Thirteenth Day of March, 2012

David J. Kappos
*Director of the United States Patent and Trademark Office*